US007860911B2

(12) United States Patent
Stribaek et al.

(10) Patent No.: US 7,860,911 B2
(45) Date of Patent: *Dec. 28, 2010

(54) EXTENDED PRECISION ACCUMULATOR

(75) Inventors: Morten Stribaek, Frederiksberg (DK); Pascal Paillier, Paris (FR)

(73) Assignee: MIPS Technologies, Inc., Sunnyvale, CA (US)

( * ) Notice: Subject to any disclaimer, the term of this patent is extended or adjusted under 35 U.S.C. 154(b) by 1269 days.

This patent is subject to a terminal disclaimer.

(21) Appl. No.: 11/410,146

(22) Filed: Apr. 25, 2006

(65) Prior Publication Data

US 2006/0190519 A1    Aug. 24, 2006

Related U.S. Application Data

(63) Continuation of application No. 09/788,685, filed on Feb. 21, 2001, now Pat. No. 7,181,484.

(51) Int. Cl.
*G06F 7/00* (2006.01)
(52) U.S. Cl. ...................................... 708/209
(58) Field of Classification Search ................ 708/501, 708/492, 209
See application file for complete search history.

(56) References Cited

U.S. PATENT DOCUMENTS

| | | |
|---|---|---|
| 3,614,406 A | 10/1971 | Brown |
| 3,642,744 A | 2/1972 | Moberly et al. |
| 3,654,621 A | 4/1972 | Bock et al. |
| 3,916,388 A | 10/1975 | Shrimp et al. |
| 4,023,023 A | 5/1977 | Bourrez et al. |
| 4,085,447 A | 4/1978 | Pertl et al. |
| 4,109,310 A | 8/1978 | England et al. |
| 4,126,896 A | 11/1978 | Yamazaki |
| 4,128,880 A | 12/1978 | Cray, Jr. |
| 4,130,880 A | 12/1978 | Nutter |
| 4,173,041 A | 10/1979 | Dvorak et al. |
| 4,219,874 A | 8/1980 | Gusev et al. |
| 4,302,820 A | 11/1981 | Struger et al. |
| 4,307,445 A | 12/1981 | Tredennick et al. |

(Continued)

FOREIGN PATENT DOCUMENTS

DE    196 44 688 A1    4/1998

(Continued)

OTHER PUBLICATIONS

Drescher, W. and Fettweis, G., "VLSI Architectures for Multiplication in *GF*(2") for Application Tailored Digital Signal Processors," in *VLSI Signal Processing, IX*, San Francisco, California, USA (Oct. 30-Nov. 1, 1996), IEEE, Piscataway, New Jersey, USA, pp. 55-64.

(Continued)

*Primary Examiner*—Tan V Mai
(74) *Attorney, Agent, or Firm*—Sterne, Kessler, Goldstein & Fox, P.L.L.C.

(57) ABSTRACT

A multiply unit includes an extended precision accumulator. Microprocessor instructions are provided for manipulating portions of the extended precision accumulator including an instruction to move the contents of a portion of the extended accumulator to a general-purpose register ("MFLHXU") and an instruction to move the contents of a general-purpose register to a portion of the extended accumulator ("MTLHX").

18 Claims, 10 Drawing Sheets

U.S. PATENT DOCUMENTS

| | | |
|---|---|---|
| 4,317,170 A | 2/1982 | Wada et al. |
| 4,394,736 A | 7/1983 | Bernstein et al. |
| 4,396,982 A | 8/1983 | Wada et al. |
| 4,434,462 A | 2/1984 | Guttag et al. |
| 4,491,910 A | 1/1985 | Caudel et al. |
| 4,495,598 A | 1/1985 | Vahlstrom et al. |
| 4,507,731 A | 3/1985 | Morrison |
| 4,511,990 A | 4/1985 | Hagiwara et al. |
| 4,520,439 A | 5/1985 | Liepa |
| 4,538,239 A | 8/1985 | Magar |
| 4,569,016 A | 2/1986 | Hao et al. |
| 4,583,199 A | 4/1986 | Boothroyd et al. |
| 4,586,130 A | 4/1986 | Butts, Jr. et al. |
| 4,763,246 A | 8/1988 | Holt et al. |
| 4,771,463 A | 9/1988 | Beeman |
| 4,773,006 A | 9/1988 | Kinoshita et al. |
| 4,809,212 A | 2/1989 | New et al. |
| 4,811,215 A | 3/1989 | Smith |
| 4,814,976 A | 3/1989 | Hansen et al. |
| 4,825,363 A | 4/1989 | Baumann et al. |
| 4,829,380 A | 5/1989 | Iadipaolo |
| 4,847,801 A | 7/1989 | Tong |
| 4,852,037 A | 7/1989 | Aoki |
| 4,860,192 A | 8/1989 | Sachs et al. |
| 4,868,777 A | 9/1989 | Nishiyama et al. |
| 4,878,174 A | 10/1989 | Watkins et al. |
| 4,879,676 A | 11/1989 | Hansen |
| 4,884,197 A | 11/1989 | Sachs et al. |
| 4,891,781 A | 1/1990 | Omura |
| 4,899,275 A | 2/1990 | Sachs et al. |
| 4,924,435 A | 5/1990 | Brunvand et al. |
| 4,928,223 A | 5/1990 | Dao et al. |
| 4,949,250 A | 8/1990 | Bhandarkar et al. |
| 4,992,934 A | 2/1991 | Portanova et al. |
| 5,005,118 A | 4/1991 | Lenoski |
| 5,073,864 A | 12/1991 | Methvin et al. |
| 5,136,696 A | 8/1992 | Beckwith et al. |
| 5,150,290 A | 9/1992 | Hunt |
| 5,177,701 A | 1/1993 | Iwasa |
| 5,181,183 A | 1/1993 | Miyazaki |
| 5,185,713 A | 2/1993 | Kobunaya |
| 5,193,202 A | 3/1993 | Jackson et al. |
| 5,220,656 A | 6/1993 | Itomitsu et al. |
| 5,222,244 A | 6/1993 | Carbine et al. |
| 5,235,686 A | 8/1993 | Bosshart |
| 5,280,439 A | 1/1994 | Quek et al. |
| 5,280,593 A | 1/1994 | Bullions, III et al. |
| 5,299,147 A | 3/1994 | Holst |
| 5,321,821 A | 6/1994 | Itomitsu et al. |
| 5,392,228 A | 2/1995 | Burgess et al. |
| 5,392,408 A | 2/1995 | Fitch |
| 5,396,502 A | 3/1995 | Owsley et al. |
| 5,418,915 A | 5/1995 | Matuda et al. |
| 5,452,241 A | 9/1995 | Desrosiers et al. |
| 5,471,628 A | 11/1995 | Phillips et al. |
| 5,479,620 A | 12/1995 | Kiyohara et al. |
| 5,499,299 A | 3/1996 | Takenaka et al. |
| 5,502,829 A | 3/1996 | Sachs |
| 5,513,366 A | 4/1996 | Agarwal et al. |
| 5,517,438 A | 5/1996 | Dao-Trong et al. |
| 5,537,562 A | 7/1996 | Gallup et al. |
| 5,537,629 A | 7/1996 | Brown et al. |
| 5,550,768 A | 8/1996 | Ogilivie et al. |
| 5,559,974 A | 9/1996 | Boggs et al. |
| 5,560,028 A | 9/1996 | Sachs et al. |
| 5,581,773 A | 12/1996 | Glover |
| 5,590,345 A | 12/1996 | Barker et al. |
| 5,598,571 A | 1/1997 | Gallup et al. |
| 5,664,136 A | 9/1997 | Witt et al. |
| 5,666,298 A | 9/1997 | Peleg et al. |
| 5,669,010 A | 9/1997 | Duluk, Jr. |
| 5,671,401 A | 9/1997 | Harrell |
| 5,673,407 A | 9/1997 | Poland et al. |
| 5,696,937 A | 12/1997 | White et al. |
| 5,713,035 A | 1/1998 | Ferrell et al. |
| 5,717,910 A | 2/1998 | Henry |
| 5,721,892 A | 2/1998 | Peleg et al. |
| 5,726,927 A | 3/1998 | Wolrich et al. |
| 5,729,554 A | 3/1998 | Weir et al. |
| 5,729,724 A | 3/1998 | Sharangpani et al. |
| 5,729,728 A | 3/1998 | Colwell et al. |
| 5,734,600 A | 3/1998 | Dieffenderfer et al. |
| 5,734,874 A | 3/1998 | Van Hook et al. |
| 5,740,340 A | 4/1998 | Purcell et al. |
| 5,748,979 A | 5/1998 | Trimberger |
| 5,752,071 A | 5/1998 | Tubbs et al. |
| 5,758,176 A | 5/1998 | Agarwal et al. |
| 5,761,523 A | 6/1998 | Wilkinson et al. |
| 5,768,172 A | 6/1998 | Derby |
| 5,774,709 A | 6/1998 | Worrell |
| 5,778,241 A | 7/1998 | Bindloss et al. |
| 5,781,457 A | 7/1998 | Cohen et al. |
| 5,784,602 A | 7/1998 | Glass et al. |
| 5,790,827 A | 8/1998 | Leung |
| 5,793,661 A | 8/1998 | Dulong et al. |
| 5,794,003 A | 8/1998 | Sachs |
| 5,796,973 A | 8/1998 | Witt et al. |
| 5,798,923 A | 8/1998 | Laskowski |
| 5,809,294 A | 9/1998 | Ando |
| 5,812,147 A | 9/1998 | Van Hook et al. |
| 5,812,723 A | 9/1998 | Ohtsu et al. |
| 5,815,695 A | 9/1998 | James et al. |
| 5,815,723 A | 9/1998 | Wilkinson et al. |
| 5,819,117 A | 10/1998 | Hansen et al. |
| 5,822,606 A | 10/1998 | Morton |
| 5,838,984 A | 11/1998 | Nguyen et al. |
| 5,838,986 A | 11/1998 | Garg et al. |
| 5,848,255 A | 12/1998 | Kondo |
| 5,848,269 A | 12/1998 | Hara |
| 5,850,452 A | 12/1998 | Sourgen et al. |
| 5,852,726 A | 12/1998 | Lin et al. |
| 5,864,703 A | 1/1999 | Van Hook et al. |
| 5,867,682 A | 2/1999 | Witt et al. |
| 5,875,336 A | 2/1999 | Dickol et al. |
| 5,875,355 A | 2/1999 | Sidwell et al. |
| 5,880,984 A | 3/1999 | Burchfiel et al. |
| 5,881,307 A | 3/1999 | Park et al. |
| 5,887,183 A | 3/1999 | Agarwal et al. |
| 5,892,960 A | 4/1999 | Seide |
| 5,918,031 A | 6/1999 | Morrison et al. |
| 5,922,066 A | 7/1999 | Cho et al. |
| 5,926,642 A | 7/1999 | Favor |
| 5,933,650 A | 8/1999 | Van Hook et al. |
| 5,936,872 A | 8/1999 | Fischer et al. |
| 5,944,776 A | 8/1999 | Zhang et al. |
| 5,953,241 A | 9/1999 | Hansen et al. |
| 5,960,012 A | 9/1999 | Spracklen |
| 5,961,629 A | 10/1999 | Nguyen et al. |
| 5,996,056 A | 11/1999 | Volkonsky |
| 5,996,062 A | 11/1999 | Sachs |
| 5,996,066 A | 11/1999 | Yung |
| 6,006,136 A | 12/1999 | Dinkjian |
| 6,006,316 A | 12/1999 | Dinkjian |
| 6,009,261 A | 12/1999 | Scalzi et al. |
| 6,009,450 A | 12/1999 | Dworkin et al. |
| 6,026,420 A | 2/2000 | DesJardins et al. |
| 6,035,120 A | 3/2000 | Ravichandran |
| 6,035,316 A | 3/2000 | Peleg et al. |
| 6,035,317 A | 3/2000 | Guy |
| 6,041,403 A | 3/2000 | Parker et al. |
| 6,058,465 A | 5/2000 | Nguyen |
| 6,058,500 A | 5/2000 | DesJardins et al. |
| 6,065,115 A | 5/2000 | Sharangpani et al. |
| 6,066,178 A | 5/2000 | Bair et al. |

| | | | |
|---|---|---|---|
| 6,067,615 A | 5/2000 | Upton | |
| 6,073,154 A | 6/2000 | Dick | |
| 6,075,937 A | 6/2000 | Scalzi et al. | |
| 6,078,941 A | 6/2000 | Jiang et al. | |
| 6,088,783 A | 7/2000 | Morton | |
| 6,122,738 A | 9/2000 | Millard | |
| 6,128,726 A | 10/2000 | LeComec | |
| 6,138,229 A | 10/2000 | Kucukcakar et al. | |
| 6,141,421 A | 10/2000 | Takaragi et al. | |
| 6,141,786 A | 10/2000 | Cox et al. | |
| 6,145,077 A | 11/2000 | Sidwell et al. | |
| 6,154,834 A | 11/2000 | Neal et al. | |
| 6,172,494 B1 | 1/2001 | Feuser | |
| 6,181,729 B1 | 1/2001 | O'Farrell | |
| 6,185,668 B1 | 2/2001 | Arya | |
| 6,192,491 B1 | 2/2001 | Cashman et al. | |
| 6,199,087 B1 | 3/2001 | Blake et al. | |
| 6,199,088 B1 | 3/2001 | Weng et al. | |
| 6,233,597 B1 | 5/2001 | Tanoue et al. | |
| 6,243,732 B1 | 6/2001 | Arakawa et al. | |
| 6,263,429 B1 | 7/2001 | Siska | |
| 6,266,758 B1 | 7/2001 | Van Hook et al. | |
| 6,279,023 B1 | 8/2001 | Weng et al. | |
| 6,282,635 B1 | 8/2001 | Sachs | |
| 6,292,883 B1 | 9/2001 | Augusteijn et al. | |
| 6,295,599 B1 | 9/2001 | Hansen et al. | |
| 6,298,438 B1 | 10/2001 | Thayer et al. | |
| 6,314,445 B1 | 11/2001 | Poole | |
| 6,336,178 B1 | 1/2002 | Favor | |
| 6,349,318 B1 | 2/2002 | Vanstone et al. | |
| 6,349,377 B1 | 2/2002 | Lindwer | |
| 6,381,690 B1 | 4/2002 | Lee | |
| 6,397,241 B1 | 5/2002 | Glaser et al. | |
| 6,421,817 B1 | 7/2002 | Mohan et al. | |
| 6,425,124 B1 | 7/2002 | Tominaga et al. | |
| 6,430,684 B1 | 8/2002 | Bosshart | |
| 6,453,407 B1 | 9/2002 | Lavi et al. | |
| 6,480,605 B1 | 11/2002 | Uchiyama et al. | |
| 6,480,872 B1 | 11/2002 | Choquette | |
| 6,513,054 B1 | 1/2003 | Carroll | |
| 6,523,054 B1 | 2/2003 | Kamijo | |
| 6,587,939 B1 | 7/2003 | Takano | |
| 6,615,366 B1 | 9/2003 | Grochowski et al. | |
| 6,618,804 B1 | 9/2003 | Steele, Jr. et al. | |
| 6,625,726 B1 | 9/2003 | Clark et al. | |
| 6,625,737 B1 | 9/2003 | Kissell | |
| 6,651,160 B1 | 11/2003 | Hays | |
| 6,658,561 B1 | 12/2003 | Benayoun et al. | |
| 6,711,602 B1 | 3/2004 | Bhandal et al. | |
| 6,715,066 B1 | 3/2004 | Steele, Jr. | |
| 6,760,742 B1 | 7/2004 | Hoyle | |
| 6,892,293 B2 | 5/2005 | Sachs et al. | |
| 6,952,478 B2 | 10/2005 | Lee et al. | |
| 6,976,178 B1 | 12/2005 | Kissell | |
| 7,003,715 B1 | 2/2006 | Thurston | |
| 7,142,668 B1 | 11/2006 | Kogure | |
| 7,162,621 B2 | 1/2007 | Kissell | |
| 7,181,484 B2 | 2/2007 | Kissell et al. | |
| 7,225,212 B2 | 5/2007 | Stribaek et al. | |
| 7,237,097 B2 | 6/2007 | Kissell et al. | |
| 7,599,981 B2 | 10/2009 | Ekner et al. | |
| 7,617,388 B2 | 11/2009 | Kissell | |
| 7,711,763 B2 | 5/2010 | Stribaek et al. | |
| 2001/0052118 A1 | 12/2001 | Steinbusch | |
| 2002/0013691 A1 | 1/2002 | Warnes | |
| 2002/0062436 A1 | 5/2002 | Van Hook et al. | |
| 2002/0069402 A1 | 6/2002 | Nevill et al. | |
| 2002/0178203 A1 | 11/2002 | Stribaek et al. | |
| 2003/0172254 A1 | 9/2003 | Mandavilli et al. | |
| 2006/0190518 A1 | 8/2006 | Ekner et al. | |
| 2009/0198986 A1 | 8/2009 | Kissell | |

FOREIGN PATENT DOCUMENTS

| | | |
|---|---|---|
| EP | 0681236 A1 | 11/1995 |
| EP | 0681236 B1 | 11/1995 |
| EP | 0 757 312 | 2/1997 |
| JP | 7-182142 | 7/1995 |
| JP | 10-11289 | 1/1998 |
| JP | 11-3226 | 1/1999 |
| JP | 11-174955 | 7/1999 |
| JP | 2000-293507 | 10/2000 |
| JP | 2000-321979 | 11/2000 |
| WO | WO97/07450 | 2/1997 |
| WO | WO97/08608 | 3/1997 |

OTHER PUBLICATIONS

Drescher, W. et al., "VLSI Architecture for Datapath Integration of Arithmetic Over $GF(2^n)$ on Digital Signal Processors," in *IEEE International Conference on Acoustics, Speech, and Signal Processing*, Munich, Germany (Apr. 21-24, 1997), IEEE, Los Alamitos, California, USA, pp. 631-634.

Texas Instruments Application Report, "The MSP430 Hardware Multiplier, Functions and Applications," [online] Apr. 1999, [Retrieved on Feb. 16, 2006] Retrieved from the Internet: <URL: http://focus.ti.com/lit/an/slaa042/s1a042.pdf> (34 pages).

Intersil Data Sheet, "HS-RTX2010RH: Radiation Hardened Real Time Express Microcontroller," [online] Mar. 2000, [Retrieved on Feb. 16, 2006] Retrieved from the Internet: <URL: http://www.intersil.com/data/fn/fn3961.pdf> (36 pages).

European Search Report from European Appl. No. EP 02 71 7430, dated Feb. 16, 2006, 3 pages.

*Can Silicon Stop the Smartcard Hackers?* Electronic Times, Feb. 15, 1999, available in Electronics Times 321999 WL 9348105 (2 pages).

Certification Report BSI-DSZ-CC-0203-03 for Philips Smart Card Controller P16WX064VOC [online]. Philips Semiconductors GmbH [Retrieved on Feb. 1, 2006]. Retrieved from the Internet: <URL: http://www.bsi.bund.de/zertifiz/zert/reporte/0203a.pdf>.

Clavier, C. et al. "Differential Power Analysis in the Presence of Hardware Countermeasures," in *Proceedings of Second International Workshop on Cryptographic Hardware and Embedded Systems, CHES2000* (Eds., C.K. Koc and C. Paar), Worcester, Massachusetts, USA, Aug. 17-18, 2000, pp. 252-263 Springer-Verlag, Berlin/Heidelberg, Germany (2000).

Clipper architecture: Information from Answers.com at http://www.answers.com/topic/clipper-architecture, 4 pages (retrieved Jul. 25, 2006).

Coron, J.-S. and Goubin, L., "On Boolean and Arithmetic Masking Against Differential Power Analysis," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 231-237, Springer-Verlag, Berlin/Heidelberg, Germany (2000).

Daemen, J. et al., "Bitslice Ciphers and Power Analysis Attacks," presented at Fast *SoftwareEncryption Workshop 2000*, New York, New York, USA, Apr. 10-12, 2000 (16 pages).

Dhem, J.F and Feyt, N., "Hardware and Software Symbiosis Helps Smart Card Evolution" [online]. IEEE Micro, Nov.-Dec. 2001, pp. 14-25 [Retrieved on Feb. 1, 2006]. Retrieved from the Internet: <URL: http://www.it.iitb.ac.In/~satish/Thesis%20Report%20New%201/2_Review%20of%20literature/2_reference/2_29_Hardware%20and%20software%20symbiosis%20helps%20smart%20card%20card%20evolution.pdf>.

Dhem, J.F and Feyt, N., "Present and Future Smart Cards" [online]. Gemplus—Card Security Group, pp. 1-9 [Retrieved on Feb. 1, 2006]. Retrieved from the Internet: <URL: http://www.it-c.dk/courses/DSK/F2003/smart2.pdf>.

Digital Equipment Corporation, VAX 11/780 Architecture Handbook, 1977. pp. 6-26, 6-27, 6-30, 6-31.

Digital Equipment Corporation, VAX 11/780 Architecture Handbook, 1977. pp. 6-39 to 6-41.

English language abstract for Japanese Patent Publication No. 7-182142 titled "Polynomial Multiplication Circuit," inventor Iwamura Keiichi, published Jul. 21, 1995, 1 page.

English language abstract for Japanese Patent Publication No. 10-11289 titled "Instruction Number Expansion Method in Parallel Processor, and Parallel Processors," inventor Kondo Yoshikazu, published Jan. 16, 1998, 1 page.

English language abstract for Japanese Patent Publication No. 11-003226 titled "Visual Instruction Set for CPU Having Integrated Graphics Function," inventor Robert Yung, published Jan. 6, 1999, 1 page.

English language abstract for Japanese Patent Publication No. 11-174955 titled "Open Key Ciphering Device, Open Key Ciphering and Deciphering Device, and Deciphering Program Recording Medium," inventors Uchiyama et al., published Jul. 2, 1999, 1 page.

English language abstract for Japanese Patent Publication No. 2000-293507 titled "Device and Method for Generating Expression Data in Operation of Finite Field," inventor Atsushi Kogure, published Oct. 20, 2000, 1 page.

English language abstract for Japanese Patent Publication No. 2000-321979 titled "Polynomial Arithmetic Device, Device for Calculating Order of Elliptic Curve, Device for Generating Elliptic Curve, and Cryptographic System for Elliptic Curve," inventor Yuichi Fuda, published Nov. 24, 2000, 1 page.

European Search Report cited in Application No. 02706275.1—2212 / 1386224 dated Oct. 23, 2008.

*Fairchild CLIPPER™ 32-Bit Microprocessor User's Manual*, Prentice-Hall, Inc., Englewood Cliffs, New Jersey (1987).

Galois Field Arithmetic Library, www.partow.net/projects/galois/, Jan. 2, 2006, 4 Pages.

"Galois Field Polynomial Generator Function Register" TMS320C6000 CPU And Instruction Set Reference Guide, Texas Instruments, Oct. 1, 2000, p. 2-26.

Hasan, M. Anwar, "Power Analysis Attacks and Algorithmic Approaches to their Countermeasures for Koblitz Curve Cryptosystems," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 93-108, Springer-Verlag, Berl in/Heidelberg, Germany (2000).

Hollingsworth, W. et al., "The Clipper Processor: Instruction Set Architecture and Implementation," Communications of the ACM, vol. 32, No. 2, pp. 200-219, ACM, Feb. 1989.

IBM Technical Disclosure Bulletin, "Bit-Manipulation Facility for a Parallel Architecture," vol. 34, No. 7A, Dec. 1991; pp. 387-390.

Kato, T. et al., "A Design for Modular Exponentiation Coprocessor in Mobile Telecommunication Terminals," in Proceedings of Second International Workshop on Cryptographic Hardware and Embedded Systems. CHES 2000 (Eds., C.K. Koc, and C. Paar), Worcester, Massachusetts, USA, Aug. 17-18, 2000, pp. 216-228, Springer-Verlag. Berlin/Heidelberg, Germany (2000).

Koc, C.K. and Acar, T., "Fast Software Exponentiation in GF(2k)," Proceedings of the 13th IEEE Symposium on Computer ,Arithmetic, Jul. 6-9,1997, pp. 225-231.

Koc, C.K. and Acar, T., "Montgomery Multiplication in GF(2k)," Proceedings of Third Annual Workshop on Selected Areas in Cryptography, pp. 95-106, Queens University, Kingston, Ontario, Canada, Aug. 15-16, 1996 (13 pages).

Kocher, P. et al., "Differential Power Analysis," in *Advances in Cryptology—Proceedings of 19th Annual International Cryptology Conference, CRYPTO '99* (Ed. Michael I. Wiener), Santa Barbara, California, USA, Aug. 15-19, 1999, Springer-Verlag, Berlin/Heidelberg, Germany (1999) pp. 388-397.

Kutler , Jeffrey, *Smart Cards: Even Abundant Security Features Don't Spur Smart Card Buy-in*, American Banker, vol. 163, No. 221, Nov. 18, 1998, available in Am. Banker 11998 WL 13326041 (3 pages).

Leung, K.H. et al., "FPGA Implementation of a Microcoded Elliptic Curve Cryptographic Processor," IEEE, 2000, pp. 68-76.

Marketing literature from Philips Semiconductors, "On the Move—Philips Semiconductors and IBM Research to Co-develop Secure Smart Cards" [online]. Feb. 1999, Document order No. 9397. 750.05157, [Retrieved on Feb. 1, 2006]. Retrieved from the Internet: <URL:http://www.semiconductors.philips.com/acrobat download/literature/9397/75005157.pdf>.

Mayer-Sommer, R., "Smartly Analyzing the Simplicity and the Power of Simple Power Analysis on Smartcards," in Proceedings of Second International Workshop on Cryptographic Hardware and Embedded Systems, CHES 2000 (Eds., C.K. Koc, and C. Paar), Worcester, Massachusetts, USA. Aug. 17-18, 2000, pp. 78-92, Springer-Verlag, Berlin/Heidelberg. Germany (2000).

Naccache, D. and Tunstall. M. "How to Explain Side-Channel Leakage to Your Kids." In *Proceedings of Second International Workshop on Cryptographic Hardware and Embedded Systems, CHES 2000* (Eds., C.K. Koc and C. Paar), Worcester, Massachusetts. USA, Aug. 17-18, 2000, pp. 229-230 Springer-Verlag, Berlin/Heidelberg, Germany (2000).

Patent Abstracts of Japan, Publication No. JP11203106 (Jul. 30, 1999), English Language Abstract for JP Patent Application No. JP19980005096 (Jan. 13, 1998).

Patent Abstracts of Japan, Publication No. JP4142618 (May 15, 1992), English Language Abstract for JP Patent Application No. JP19900264991 (Oct. 4, 1990).

Patent Abstracts of Japan, Publication No. JP61223938 (Oct. 4, 1986), English Language Abstract for JP Patent Application No. JP19850063782 (Mar. 29, 1985).

Patent Abstracts of Japan, Publication No. JP8314717 (Nov. 29, 1996), English Language Abstract for JP Patent Application No. JP19960146619 (May 16, 1996).

Patent Abstracts of Japan, Publication No. JP2003533829T (Nov. 11, 2003), English Language Abstract for JP Patent Application No. JP20010585439T (May 7, 2001).

Philips Semiconductors Short Form Specification, "P16WX064 SmartXA-Family, Secure 16-bit Smart Card Controller," Revision 1.1 [online]. Feb. 2001, pp. 1-11 [Retrieved on Feb. 1, 2006]. Retrieved from the Internet: <URL: httn://www.semiconductors. philips.com/acrobatdownload/other/identification/sfs052411.pdf>.

*Security Target BSI-DSZ-CC-0203, Version 1.1*, Jan. 24, 2003, *Evaluation of the Philips PI6WX064VOC Secure 16-bit Smart Card Controller* [online]. Philips Semiconductors GmbH, pp. 1-74 [Retrieved on Feb. 1, 2006]. Retrieved from the Internet: <URL: http://www.commoncriteriaportal.org/public/files/epfiles/0203b.pdf>.

Shamir. A., "Protecting Smart Cards from Passive Power Analysis with Detached Power Supplies," in *Proceedings of Second International Workshop on Cryptographic Hardware and Embedded Systems. CHES 2000* (Eds., C.K. Koc and C. Paar), Worcester, Massachusetts, USA, Aug. 17-18, 2000, pp. 71-77 Springer-Verlag, Berlin/Heidelberg, Germany (2000).

Shi, Z., et al., "Bit Permutation Instructions for Accelerating Software Cryptography," Proceedings of the IEEE International Conference on Application-specific Systems, Architectures and Processors, pp. 138-148, Boston, MA (Jul. 10-12, 2000).

*STMicroelectronics and Gemplus Announce Smart Card Security Certification Including Hardware and Software*, EDP Weekly's IT Monitor, vol. 42, Issue 13, Apr. 2, 2001, EDP Wkly. .42001 WL 14018034 (3 pages).

*STMicroelectronics and Gemplus Announce Smart Card Security Certification Including Hardware and Software*. Business Wire, Mar. 29, 2001, Westlaw, Mar. 29, 2001 Bus. Wire 02:05:00 (3 pages).

Tanenbaum, A.S., Structured Computer Organization, Prentice-Hall, Inc. 1984, pp. 10-12.

Vollmer, A., *Security IC's Are Targeting Consumer Applications*, Electronic Design, vol. 48, Issue 23, Nov. 6, 2000, Electronic Design 1052000 WL 14003957 (13 pages).

Weingart, S.H., "Physical Security Devices for Computer Subsystems: A Survey of Attacks and Defenses," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 302-317, Springer-Verlag, Berlin/Heidelberg, Germany (2000).

Wikibooks article, "Data Coding Theory/Modulo-2 Arithmetic", author unknown, retrieved Jul. 30, 2008, 2 Pages.

Wikipedia article, "Finite field arithmetic", www.wikipedia.com, author unknown, retreived Jul. 30, 2008, 4 Pages.

Office Communication, dated Aug. 13, 2003, for U.S. Appl. No. 09/788,670, filed Feb. 21, 2001.
Office Communication, dated Apr. 22, 2004, for U.S. Appl. No. 09/788,670, filed Feb. 21, 2001.
Office Communication, dated Feb. 23, 2005, for U.S. Appl. No. 09/788,670, filed Feb. 21, 2001.
Office Communication, dated Oct. 4, 2005, for U.S. Appl. No. 09/788,670, filed Feb. 21, 2001.
Office Communication, dated Jun. 21, 2006, for U.S. Appl. No. 09/788,670, filed Feb. 21, 2001.
Office Communication, dated Jan. 26, 2007, for U.S. Appl. No. 09/788,670, filed Feb. 21, 2001.
Office Communication, dated Aug. 9, 2007, for U.S. Appl. No. 09/788,670, filed Feb. 21, 2001.
Office Communication, dated Nov. 26, 2007, for U.S. Appl. No. 09/788,670, filed Feb. 21, 2001.
Office Communication, dated Jul. 3, 2008, for U.S. Appl. No. 09/788,670, filed Feb. 21, 2001.
Office Communication, dated Nov. 24, 2008, for U.S. Appl. No. 09/788,670, filed Feb. 21, 2001.
Office Communication, dated Dec. 29, 2003, for U.S. Appl. No. 09/788,682, filed Feb. 21, 2001.
Office Communication, dated Jun. 24, 2004, for U.S. Appl. No. 09/788,682, filed Feb. 21, 2001.
Office Communication, dated Nov. 19, 2004, for U.S. Appl. No. 09/788,682, filed Feb. 21, 2001.
Office Communication, dated Jun. 27, 2005, for U.S. Appl. No. 09/788,682, filed Feb. 21, 2001.
Office Communication, dated Feb. 22, 2006, for U.S. Appl. No, 09/788,682, filed Feb. 21, 2001.
Office Communication, dated Jun. 25, 2004, for U.S. Appl. No. 09/788,683, filed Feb. 21, 2001.
Office Communication, dated Aug. 23, 2006, for U.S. Appl. No. 09/788,683, filed Feb. 21, 2001.
Office Communication, dated Jan. 10, 2007, for U.S. Appl. No. 09/788,683, filed Feb. 21, 2001.
Office Communication, dated Apr. 5, 2004, for U.S. Appl. No. 09/788,684, filed Feb. 21, 2001.
Office Communication, dated Nov. 23, 2004, for U.S. Appl. No. 09/788,684, filed Feb. 21, 2001.
Office Communication, dated Jun. 9, 2005, for U.S. Appl. No. 09/788,684, filed Feb. 21, 2001.
Office Communication, dated May 30, 2006, for U.S. Appl. No. 09/788,684, filed Feb. 21, 2001.
Office Communication, dated Feb. 7, 2007, for U.S. Appl. No. 09/788,684, filed Feb. 21, 2001.
Office Communication, dated Sep. 5, 2007, for U.S. Appl. No. 09/788,684, filed Feb. 21, 2001.
Office Communication, dated Feb. 6, 2008, for U.S. Appl. No. 09/788,684, filed Feb. 21, 2001.
Office Communication, dated Aug. 4, 2008, for U.S. Appl. No. 09/788,684, filed Feb. 21, 2001.
Office Communication, dated Sep. 15, 2005, for U.S. Appl. No. 10/195,522, filed Jul. 16, 2002.
Office Communication, dated May 18, 2006, for U.S. Appl. No. 10/195,522, filed Jul. 16, 2002.
Office Communication, dated Jan. 9, 2007, for U.S. Appl. No. 10/195,522, filed Jul. 16, 2002.
Office Communication, dated May 7, 2007, for U.S. Appl. No. 11/644,001, filed Dec. 22, 2006, 4 pages.
Office Communication, dated Nov. 26, 2007, for U.S. Appl. No. 11/644,001, filed Dec. 22, 2006, 4 pages.
Office Communication, dated Jul. 28, 2008, for U.S. Appl. No. 11/644,001, filed Dec. 22, 2006, 4 pages.
International Search Report, dated Sep. 13, 2002, for PCT Appl. No. PCT/US02/04414, 3 pages.
Lijun Gao, Sarvesh Shrivastava, Hanbo Lee, Gerald E. Sobelman, "A Compact Fast Variable Key Size Elliptic Curve Cryptosystem Coprocessor," *Proceedings of the 7th Annual IEEE Symposium on Field-Programmable Custom Computing Machines*, Apr. 21-23, 1999, pp. 304-305 (4 pages).

Jae Wook Chung et al., *Fast Implementation of Elliptic Curve Defined over $GF(p^m)$ on CalmRISC with MAC2424 Coprocessor*, C.K. Koc and C. Paar (Eds.): CHES 2000, LNCS 1965, pp. 57-70, 2000.
Darrel Hankerson et al., *Software Implementation of Elliptic Curve Cryptography over Binary Fields*, C.K. Koc and C. Paar (Eds.): CHES 2000, LNCS 1965, pp. 1-24, 2000.
Marc Joye et al., *Efficient Generation of Prime Numbers*, C.K. Koc and C. Paar (Eds.): CHES 2000, LNCS 1965, pp. 340-354, 2000.
Souichi Okada et al., *Implementation of Elliptic Curve Cryptographic Coprocessor over $GF(2^m)$ on an FPGA*, C.K. Koc and C. Paar (Eds.): CHES 2000, LNCS 1965, pp. 25-40, 2000.
Geraldo Orlando et al., *A High-Performance Reconfigurable Elliptic Curve Processor for $GF(2^m)$\**, C.K. Koc and C. Paar (Eds.): CHES 2000, LNCS 1965, pp. 41-56, 2000.
Erkay Savas et al., *A Scalable and Unified Multiplier Architecture for Finite Fields $GF(p)$ and $GF(2^m)$* \*, C.K. Koc and C. Paar (Eds.): CHES 2000, LNCS 1965, pp. 277-292, 2000.
Zhijie Shie et al., "Bit Permutation Instructions for Accelerating Software Cryptography," *Proceedings of the IEEE International Conference on Application-specific Systems, Architectures and Processors*, Jul. 10-12, 2000, Boston, Massachusetts, USA, pp. 138-148.
IBM Technical Disclosure Bulletin, *Pipelined Hardware Multiplier with Extended Precision*, vol. 23, Issue No. 9, pp. 4322-4323, Feb. 1981.
Bier, J., "DSP16xxx Targets Communications Apps," *Microprocessor Report*, MicroDesign Resources, Sep. 15, 1997, pp. 11-15.
Case, Brian, "Superscalar Techniques: SuperSPARC vs. 88110," *Microprocessor Report*, vol. 5, No. 22, Dec. 4, 1991, pp. 1 and 6-11.
Diefendorff, K., "*The 88110: A Superscalar Microprocessor with Graphics Support*" (Motorola), Microprocessor Forum, Nov. 1991, 20 pages (Bates Nos. L00622-00641).
Diefendorff, K. and Allen, M., "*Organization of the Motorola 88110: A Superscalar RISC Microprocessor*," Motorola, Inc., date unknown, 12 pages (Bates Nos. L00642-00653).
El-Sharkawy, Mohamed, Ph.D., *Digital Signal Processing Applications with Motorola's DSP56002 Processor*, Prentice Hall PTR, 1996, pp. 43-124 (Bates Nos. L06519-06601).
Eyre, Jennifer and Bier, Jeff, "Infineon's TriCore Tackles Dsp," *Microprocessor Report*, Apr. 19, 1999, pp. 12-14.
Feigel, Curtis P., "TI Introduces Four-Processor DSP Chip," *Microprocessor Report*, Mar. 28, 1994, pp. 22-25.
Gwennap, L., "Digital, MIPS Add Multimedia Extensions," *Microprocessor Report*, MicroDesign Resources, vol. 10, No. 15, Nov. 18, 1996, pp. 1-5.
Gwennap, L., "Intel's MMX Speeds Multimedia," *Microprocessor Report*, MicroDesign Resources, vol. 10, No. 3, Mar. 5, 1996, pp. 1-6.
Gwennap, L., "New Multimedia Chips to Enter the Fray," *Microprocessor Report*, MicroDesign Resources, vol. 10, No. 13, Oct. 1996, 1 page.
Gwennap, L., "UltraSparc Adds Multimedia Instructions," *Microprocessor Report*, MicroDesign Resources, vol. 8, No. 16, Dec. 5, 1994, pp. 1-3.
Halfhill, Tom R. and Belgard, Rich," *Mips vs. Lexra*: Definitely Not Aligned," *Microprocessor Report*, vol. 13, No. 16, Dec. 6, 1999, pp. 1-5.
Hansen, Craig, "Architecture of a Broadband Mediaprocessor," COMPCON96, Feb. 25-29, 1996, 8 pages.
Hays, Pat, *LX5280 High-Performance RISC-DSP for IP Licensing*, at http://www.lexra.com/presentation/, 27 pages. (Jun. 8, 1999).
Heinrich, J., *MIPS R4000 Microprocessor User's Manual, Second Edition*, MIPS Technologies, Inc., 1994, pp. 154-155, 157, 159, 161, 168, 170-171, B-9, B-10, B-13, B-17, B-19, B-21, B-23, B-27, B-38, B-40, and B-62.
Killian, E., "MIPS Extensions for Digital Media," Microprocessor Forum, Oct. 22-23, 1996, pp. 1-5.
Lee, Ruby, "Accelerating Multimedia with Enhanced Microprocessors," *IEEE Micro*, IEEE, Apr. 1995, pp. 22-32 (Bates Nos. L08566-L08576).
Peleg, A. and Weiser, U., "MMX Technology Extension to the Intel Architecture," *IEEE Micro*, IEEE, Aug. 1996, pp. 42-50 (Bates Nos. L07222-L07230).
Turley, J., "Siemens TriCore Revives CISC Techniques," *Microprocessor Report*, MicroDesign Resources, Nov. 17, 1997, pp. 13-16.

Turley, Jim and Hakkarainen, Harri, "TI's New 'C6x DSP Screams at 1,600 MIPS," *Microprocessor Report*, Feb. 17, 1997, pp. 14-17.

Weiss, R., *ARM Piccolo Mixes ARM RISC with DSP*, at http://www.estd.com/Editorial/1996/11/Briefs/arm.html, 1 page (Nov. 1996).

Yarlagadda, Krishna, "Lexra Adds DSP Extension," *Microprocessor Report*, Aug. 23, 1999, pp. 19-21 (printed from West database, 6 pages).

*601 First Silicon*, at http://www.mot.com/SPS/PowerPC/library/press_releases/601_First_Silicon.html, 2 pages, (Oct. 1, 1992).

88410 Second Level Cache, *Microprocessor Forum*, Motorola, Inc., Nov. 1991, 20 pages (Bates Nos. L00622-L00641).

*A236 Parallel Digital Signal Processor Chip Programmer's Reference Manual*, Oxford Micro Devices, Inc., 1994, 195 pages (Bates Nos. L11184-L11378).

*AN1214: MC881 10 64-bit External Bus Interface to 16-bit EPROM*, at http://www.mot-sps.com/lit/html/an1214.html, 1 page (Jan. 24, 1997).

*DSP56000 24-Bit Digital Signal Processor Family Manual*, Motorola, Inc., 1995, 638 pages (Bates Nos. L08722-L09359).

*DSP56002 24-Bit Digital Signal Processor User's Manual*, Motorola, Inc., 1995, 386 pages (Bates Nos. L07277-L07662).

*DSP6002/DSP56L002 Motorola Semiconductor Product Information*, Motorola, Inc., 1994, 3 pages (Bates Nos. L07913-L07915).

*DSP56002 Semiconductor Technical Data*, Motorola, Inc., 1996, 110 pages (Bates Nos. L07803-L07912).

*EB162: Programming TIPS (MC88110)*, at http://www.mot-sps.com/lit/html/eb162.html, 1 page (Jan. 24, 1997).

Hardware Implications of *xmem* as a st followed by a *Id, Motorola Semiconductor Engineering Bulletin*, Motorola, Sep. 1992, 5 pages.

*i860™Microprocessor Family Programmer's Reference Manual*, Intel Corporation, 1992, 79 pages (Bates Nos. L09361-L09439).

*IEEE Standard for Binary Floating-Point Arithmetic*, IEEE, 1985, pp. i-vi and 1-14.

Interrupt Latency in the MC8110, *Motorola Semiconductor Engineering Bulletin*, Motorola, 1992, pp. 1, 2, and 4-9.

*An Introduction to Thumb™*, Version 2.0, Advanced RISC Machines, Mar. 1995, 29 pages.

*Lexra Announces Industry's First RISC-DSP Core Based on MIPS® Instruction Set Architecture*, at http://www.lexra.com/pr_990505.html, 3 pages (May 5, 1999).

*Lexra Announces Industry's Fastest 32-BIT RISC Core to Execute MIPS® Instructions\**, at http://www.lexra.com/pr_990719.html, 2 pages (Jul. 19, 1999).

*Lexra Announces the First Mainstream 32-bit RISC Core In A Programmable Logic Device*, at http://www.lexra.com/pr_981005.html, 3 pages (Oct. 5, 1998).

*Lexra Announces its LX4080 Evaluation System is Proven and Available for Production*, at http://www.lexra.com/pr_980720.html, 2 pages (Jul. 20, 1998).

*Lexra Announces LX4080 Embedded RISC Processor Core, Delivering High Performance & executes MIPS-I instructions set\**, at http://www.lexra.com/pr_980112.html, 2 pages (Jan. 12, 1998).

*Lexra Announces LX4080 SmoothCore™ Silicon Proven RISC Core*, at http://www.lexra.com/pr_980323.html, 3 pages (Mar. 23, 1998).

*Lexra Announces Next Generation Embedded RISC Core*, at http://www.lexra.com/pr_990111.html, 3 pages (Jan. 11, 1999).

*Lexra ASYM-LX Instruction Set Simulator Product Brief*, date unknown, 2 pages.

*Lexra ASYM-LX Simulator/FIR Filter Demo*, date unknown, 5 pages.

*Lexra Command User Environment (CLUE) for ASYM-LX User's Guide*, Revision 1.1, Jan. 28, 2000, pp. 1-32.

*Lexra LX5280 Seminar Slides*, date unknown, 49 pages.

*Lexra [Products]*, at http://www.lexra.com/lx_products2.html, 2 pages.(Copyright 1998-1999).

Lexra Rolls Out Second MIPS Core (Lexra LX4180) (Product Announcement), *Microprocessor Report*, Jan. 28, 1999, 2 pages (printed from West database).

*LX4080*, at http://www.lexra.com/lx4080.html, 8 pages (Copyright 1998-1999).

*LX4080P*, at http://www.lexra.com/lx4080p.html, 6 pages (Copyright 1998-1999).

*LX4180*, at http://www.lexra.com/1x4180.html, 9 pages (Copyright 1998-1999).

*LX4280*, at http://www.lexra.com/lx4280.html, 2 page (Copyright 1998-1999).

*LX4280* Fills Lexra's Midrange (MIPS-compatible embedded processor core) (Product Announcement), *Microprocessor Report*, Aug. 2, 1999, 2 pages (printed from West database).

*LX5280*, at http://www.lexra.com/lx5280.html, 2 pages (Copyright 1998-1999).

*MC88110/410DH/AD: MC88410/MC88410 Designer's Handbook*, at http://www.mot-sps.com/lit/html/mc88110410dhad.html, 1 page (Jan. 24, 1997).

*MC88110UM/AD: MC88110 Second Generation RISC Microprocessor User's Manual*, at http://www.mot-sps.com/lit/html/mc88110umad.html, 1 page (Jan. 24, 1997).

*MC88410UM/AD: MC88410 Secondary Cache Controller User's Manual*, at http://www.mot-sps.com/lit/html/mc88410umad.html, 1 page (Jan. 24, 1997).

*Microprocessor Devices Reliability Monitor Report: Third Quarter 1997*, Motorola, 8 pages (1997).

*Microprocessor Devices Reliability Monitor Report: Fourth Quarter 1997*, Motorola, 10 pages (1997).

*MIPS Technologies, Inc. Files Lawsuit to Protect Intellectual Property Rights*, at http://www.mips.com/pressReleases/102899B.html, 2 pages (Oct. 28, 1999).

*MIPS Technologies, Inc. Litigation Overview and Q&A*, at http://www.mips.com/pressReleases/102899D.html, 3 pages (visited Feb. 24, 2000).

*MIPS:Open Letter from John Bourgoin, CEO MIPS Technologies*, at http://www.mips.com/pressReleases/102899C.html, 2 pages (visited Feb. 24, 2000).

*Piccolo—The ARM Signal Processing Architecture*, at http://www.calab.cs.pusan.ac.kr/TechnicalReport . . . , 12 pages (visited Mar. 6, 2001).

*QML-DSP/MCM and Die Courier*, at http://www.ti.com/sc/does/military/liter/ecour/dsp.htp, 7 pages (Jan. 1996).

*Reliability Monitor Environmental Stress Data 3Q97*, Motorola, 1997, 4 pages.

*Reliability and Quality Report 3Q97*, Motorola, 1997, 2 pages.

*Reliability and Quality Report 4Q97*, Motorola, 1997, 2 pages.

Running the MC88110 in *Lockstep, Motorola Semiconductor Engineering Bulletin*, Motorola, 1992, 2 pages.

*TMS320C1x/C2x/C2xx/C5x Assembly Language Tools User's Guide*, Texas Instruments, Mar. 1995, 483 pages (Bates Nos. L07916-L08398).

*TMS320C5x General-Purpose Applications User's Guide*, Texas Instruments, Jul. 1997, 167 pages (Bates Nos. L08399-L08565).

*TMS32010 User's Guide*, Texas Instruments Incorporated, 1983, pages 1183.

*TMS320C80 Digital Signal Processor*, Texas Instruments, Jul. 1984, page 41.

*VIS™ 3Instruction Set User's Manual*, Sun Microsystems, Inc., pp. i-xii and 1-136 at http://www.nondot.org/sabre/os/files/processors/VISInstructionSetUsersManual.pdf. (1997).

| Special 000000 | 0 00000000000 | rd | MFLHXU 00001 | MFLO/MFLHXU 010010 |
|---|---|---|---|---|
| 6 | 10 | 5 | 5 | 6 |
| 31   26 | 25   16 | 15   11 | 10   6 | 5   0 |

FIG. 10A

| Special 000000 | rs | MTLHX 000000000000001 | MTLO/MTLHX 010011 |
|---|---|---|---|
| 6 | 5 | 15 | 6 |
| 31   26 | 25   21 | 20   6 | 5   0 |

FIG. 10B

EXTENDED PRECISION ACCUMULATOR

CROSS REFERENCE TO RELATED APPLICATIONS

This application is a continuation of U.S. patent application Ser. No. 09/788,685, filed Feb. 21, 2001, now U.S. Pat. No. 7,181,484, issued Feb. 20, 2007, which is incorporated herein by reference in its entirety; and this application is related to the following commonly owned patent applications: (1) U.S. patent application Ser. No. 09/788,683, filed Feb. 21, 2001, now U.S. Pat. No. 7,237,097, issued Jun. 26, 2007; (2) U.S. patent application Ser. No. 09/788,670, filed Feb. 21, 2001, now U.S. Pat. No. 7,599,981, issued Oct. 6, 2009; (3) U.S. patent application Ser. No. 09/788,684, filed Feb. 21, 2001, now U.S. Pat. No. 7,711,763, issued May 4, 2010; and (4) U.S. patent application No. 09/788,682, filed Feb. 21, 2001, now U.S. Pat. No. 7,162,621, issued Jan. 9, 2007, each of which is incorporated herein by reference. U.S. patent application Ser. No. 10/195,522, filed Jul. 16, 2002, now U.S. Pat. No. 7,225,212, issued May 29, 2007, is a divisional of U.S. patent application Ser. No. 09/788,685, filed Feb. 21, 2001, now U.S. Pat. No. 7,181,484, issued Feb. 20, 2007.

FIELD OF THE INVENTION

This invention relates to a microprocessor multiplier, and more particularly to a microcomputer multiplier with an extended precision accumulator.

BACKGROUND OF THE INVENTION

Reduced instruction set computer (RISC) architectures were developed as industry trends tended towards larger, more complex instruction sets. By simplifying instruction set designs, RISC architectures make it easier to use techniques such as pipelining and caching, thus increasing system performance.

RISC architectures usually have fixed-length instructions (e.g., 16-bit, 32-bit, or 64-bit), with few variations in instruction format. Each instruction in an instruction set architecture (ISA) may have the source registers always in the same location. For example, a 32-bit ISA may always have source registers specified by bits 16-20 and 21-25. This allows the specified registers to be fetched for every instruction without requiring any complex instruction decoding.

BRIEF SUMMARY OF THE INVENTION

Cryptographic systems ("cryptosystems") are increasingly used to secure transactions, to encrypt communications, to authenticate users, and to protect information. Many private-key cryptosystems, such as the Digital Encryption Standard (DES), are relatively simple computationally and frequently reducible to hardware solutions performing sequences of XORs, rotations, and permutations on blocks of data. Public-key cryptosystems, on the other hand, may be mathematically more subtle and computationally more difficult than private-key systems.

While different public-key cryptography schemes have different bases in mathematics, they tend to have a common need for integer computation across very large ranges of values, on the order of 1024 bits. This extended precision arithmetic is often modular (i.e., operations are performed modulo a value range), and in some cases polynomial instead of twos-complement. For example, RSA public-key cryptosystems use extended-precision modular exponentiation to encrypt and decrypt information and elliptic curve cryptosystems use extended-precision modular polynomial multiplication.

Public-key cryptosystems have been used extensively for user authentication and secure key exchange, while private-key cryptography has been used extensively to encrypt communication channels. As the use of public-key cryptosystems increases, it becomes desirable to increase the performance of extended-precision modular arithmetic calculations.

In one general aspect, a multiply unit is provided for use in a microprocessor having at least one general-purpose register for storing a predetermined number of bits. The multiply unit includes a multiplier and an extended-precision accumulator including more bits than each of the general-purpose registers.

Implementations include using the multiplier to provide a multiply-add operation whereby operands to the multiply unit are multiplied and added to the contents of the extended-precision accumulator. The multiplier may include an arithmetic multiplier and a polynomial multiplier.

In a polynomial multiplier implementation, a multiply-add operation multiplies two operands and adds the result to the contents of the extended-precision accumulator using an exclusive-or operation. In some implementations, the multiplier includes result logic for selecting which values to load into the extended-precision accumulator. For example, the result logic may be implemented as a multiplexer.

In some implementations, the extended-precision accumulator includes an extended register, a high-order register, and a low-order register. For example, the extended register may store 8-bit values and the other two registers may store 32-bit values. Instructions are provided for manipulating the contents of the extended-precision accumulator. One instruction moves a value from the extended-precision accumulator into a general-purpose register and an inverse instruction moves a value from a general-purpose register into the extended-precision accumulator. The instructions additionally may shift the contents of the extended-precision register.

The details of one or more implementations are set forth in the accompanying drawings and the description below. Other features and advantages will be apparent from the description and drawings, and from the claims.

BRIEF DESCRIPTION OF THE DRAWINGS/FIGURES

FIGS. 10A and 10B are instruction encodings for exemplary instructions manipulating an extended-precision multiplier.

DETAILED DESCRIPTION OF THE INVENTION

Many public-key cryptosystems use extended-precision modular arithmetic to encrypt and decrypt data. For example, many elliptic curve (EC) cryptosystems extensively use polynomial multiplication and addition to encrypt and decrypt data. Performance of elliptic curve cryptosystems may be enhanced by modifying a programmable CPU multiplier to be responsive to newly defined instructions dedicated to polynomial operations.

When using elliptic curves defined over $GF(2^{163})$ (as recommended by the IEEE 1363-2000 standard), the main operation needed is multiplication over the field $GF(2^{163})$. Each of the $2^{163}$ elements can be represented as a polynomial of degree at most 163 with coefficients equal to 0 or 1. In this representation, two elements may be added using a simple bitwise XOR and two polynomials, a(X) and b(X), may be multiplied by computing a(X)b(X) mod P(X), where the product a(X)b(X) is a 326-degree polynomial, and P(X) is an irreducible polynomial as specified by the IEEE 1363-2000 standard.

Polynomial multiplication has the same form as modular multiplication, ab mod p, over the integers, except that: (1) regular addition is replaced by an XOR; and (2) regular 32-bit multiplication is replaced by a 32-bit carry-free multiplication. Therefore, polynomial modular multiplication may be performed using shifts and XORs instead of shifts and adds.

It is desirable to provide a multiply unit that supports fast polynomial multiplication and various other operations to increase the performance of cryptographic and other systems.

Providing support for extended precision modular arithmetic and polynomial operations can increase the performance of cryptosystems. Some cryptographic systems, such as those performing RSA cryptographic signature authentication, perform successive extended precision modular multiplications, accumulating the sum of the results. The performance of these systems may be increased by providing support in a multiply unit for an instruction to multiply two operands and add the result to an accumulator. When successive multiply/adds are performed, the accumulator may overflow. It is desirable to provide an extended precision accumulator to provide increased performance in cryptosystems and other systems.

Figure 1:
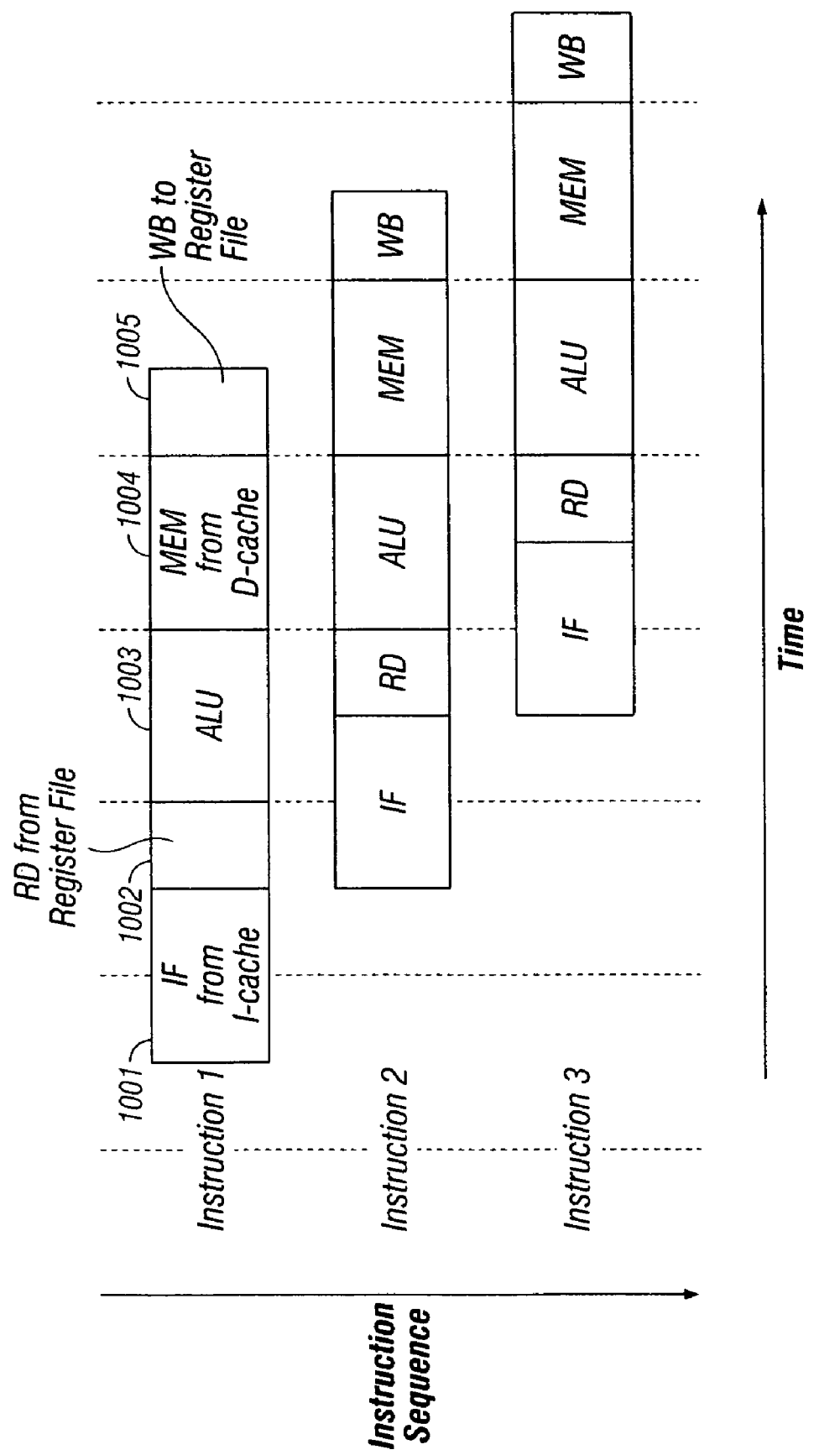
FIG. 1 is a block diagram of an exemplary five-stage pipeline that may be used in a RISC architecture.

Referring to FIG. 1, an exemplary microprocessor architecture that may be used to implement polynomial multiplication includes a five-stage pipeline in which an instruction may be issued each clock cycle and executed in a fixed amount of time, such as, for example, four clock cycles. The execution of each instruction is divided into five stages: instruction fetch (IF) stage 1001, register read (RD) stage 1002, arithmetic/logic unit (ALU) stage 1003, memory (MEM) stage 1004, and write back (WB) stage 1005. In the IF stage 1001, a specified instruction is fetched from an instruction cache. A portion of the fetched instruction is used to specify source registers that may be used in executing the instruction. In the read registers (RD) stage 1002, the system fetches the contents of the specified source registers. These fetched values may be used to perform arithmetic or logical operations in the ALU stage 1003. In the MEM stage 1004, an executing instruction may read/write memory in a data cache. Finally, in the WB stage 1005, values obtained by the execution of the instruction may be written back to a register.

Because some operations, such as floating point calculations and integer multiply/divide, cannot always be performed in a single clock cycle, some instructions merely begin execution of an instruction. After sufficient clock cycles have passed, another instruction may be used to retrieve a result. For example, when an integer multiply instruction takes five clock cycles, one instruction may initiate the multiplication calculation, and another instruction may load the results of the multiplication into a register after the multiplication has completed. If a multiplication has not completed by the time a result is requested, the pipeline may stall until the result is available.

Figure 2:
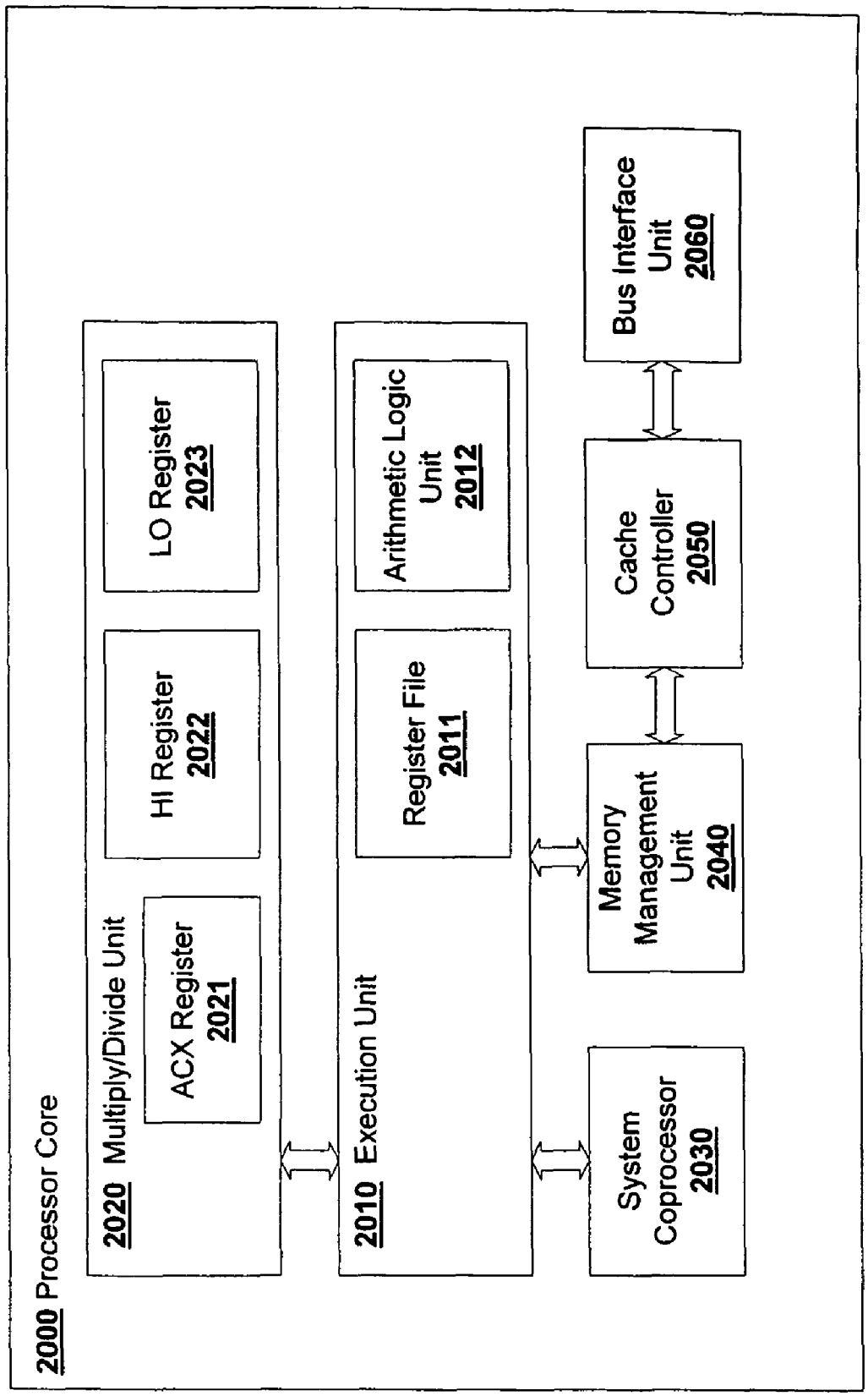
FIG. 2 is a block diagram of a processor core including an execution unit and a multiply unit.

Referring to FIG. 2, an exemplary RISC architecture is provided by way of example. The processor core 2000 (also referred to as a "microprocessor core") includes the following: an execution unit 2010, a multiply/divide unit (MDU) 2020, a system control coprocessor (CP0) 2030, a memory management unit 2040, a cache controller 2050, and a bus interface unit (BIU) 2060.

Execution unit 2010 is the primary mechanism for executing instructions within processor core 2000. Execution unit 2010 includes a register file 2011 and an arithmetic logic unit (ALU) 2012. In one implementation, the register file 2011 includes 32 32-bit general-purpose registers that may be used, for example, in scalar integer operations and address calculations. The register file 2011, which includes two read ports and one write port, may be fully bypassed to minimize operation latency in the pipeline. ALU 2012 supports both logical and arithmetic operations, such as addition, subtraction, and shifting.

The MDU 2020 may be used to perform various operations including some or all of the following instructions described below: DIV, DIVU, MADD, MADDU, MFHI, MFLO, MSUB, MSUBU, MTHI, MTLO, MUL, MULT, MULTU, MFLHXU, MTLHX, MADDP, MULTP, and PPERM.

In one implementation, LO register 2023 and HI register 2022 are each 32 bits wide and function as dedicated output registers of MDU 2020. In one implementation, ACX register 2021 provides 8 bits of additional integer precision beyond those provided by the HI/LO register pair. The precise number of bits is implementation dependent, with the preferred minimum size being 8 bits. For processors with 32-bit data paths, the preferred maximum size of the ACX register is 32 bits. In contrast, for processors with 64-bit data paths, the preferred maximum size of the ACX register is 64 bits. Hence, in a processor with 32-bit wide HI and LO registers, the combination of registers ACX/HI/LO can hold a concatenated value having more than 64 bits.

Figure 3:
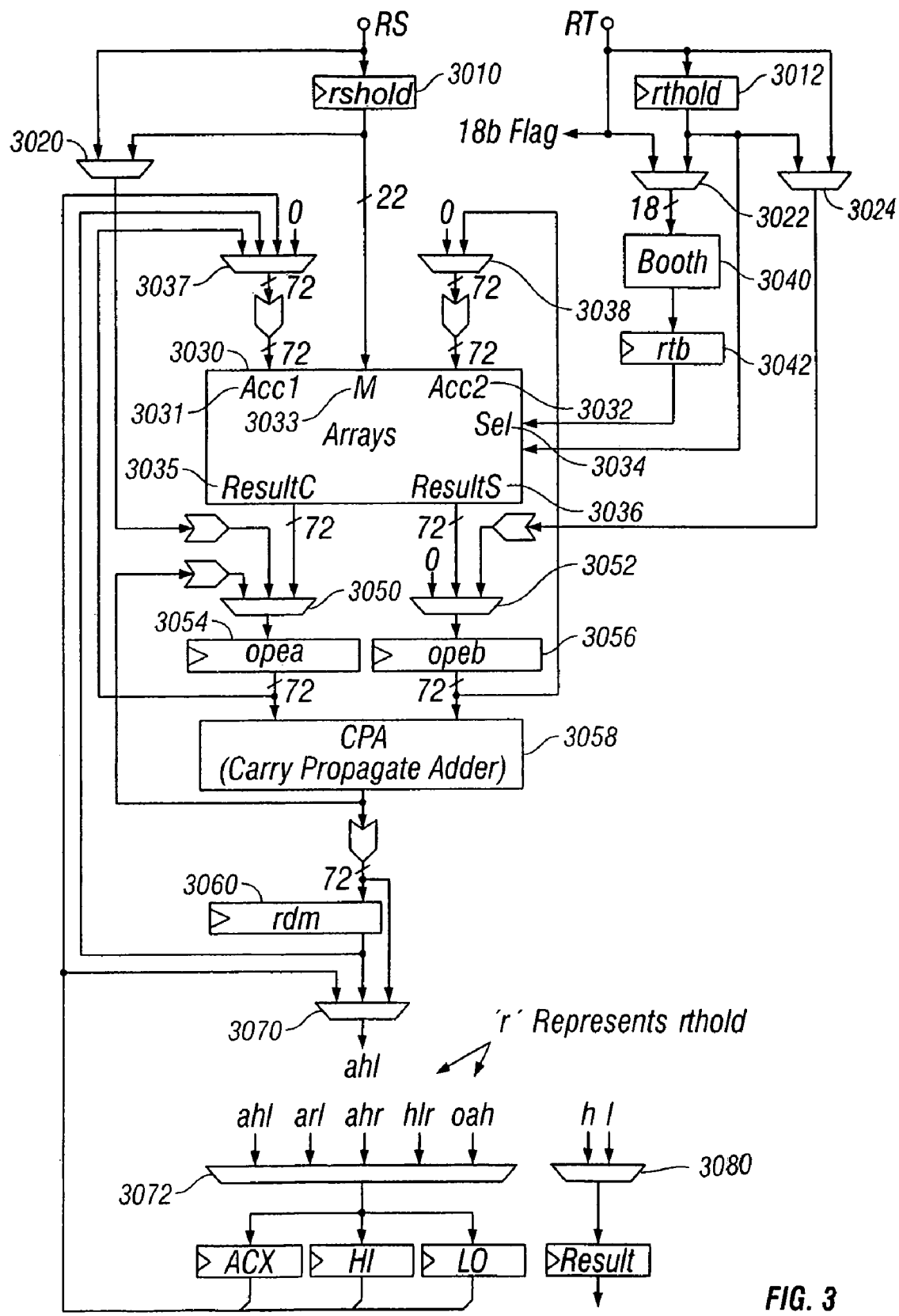
FIG. 3 is a diagram of data paths in an implementation of a multiply unit supporting binary polynomial arithmetic.

In the implementation described in FIGS. 2 and 3, the MDU 2020 includes a divide unit. However, other implementations provide separate multiply and divide units implementing an extended accumulator in either the multiply unit, the divide unit, or in both the multiply and divide units.

The instructions MUL, MULT, and MULTU may be used to multiply two 32-bit numbers together. The result is stored in a specified register for MUL, and in the HI/LO registers for MULT and MULTU. For example, "MUL $7, $6, $5" multiplies the contents of registers $6 and $5 together and stores the result in register $7. The instruction "MULT $6, $5" multiplies the contents of registers $6 and $5 together and stores the result in the HI/LO registers. The MULTU instruction performs the same operation as MULT with MULTU applying to unsigned operands and MULT applying to signed operands. Additionally, the MULTU instruction clears the ACX register to all zeros.

The instructions DIV and DIVU perform division operations and store the results in the ACX/HI/LO registers. For example, "DIV $6, $5" divides the contents of register $6 by the contents of register $5 and stores the result in the ACX/HI/LO registers. The DIVU instruction performs the same operation on unsigned operands.

The instructions MSUB, MSUBU, MADD, and MADDU may be used to multiply the contents of two registers and then add or subtract the contents of the ACX/HI/LO registers. For example, "MSUB $6, $5" multiplies the contents of registers $6 and $5 together, subtracts the contents of the ACX/HI/LO registers from the result, and then stores the value in the ACX/HI/LO registers. The MADD instruction similarly multiplies the contents of two registers, adds the result to the ACX/HI/LO registers, and stores the result in the ACX/HI/LO registers. The MSUBU and MADDU perform the same operations on unsigned operands. In some implementations, the ACX register is not used in some operations and the contents of the ACX register following such operations may be undefined.

The MFHI, MFLO, MTHI, MTLO, MFLHXU, and MTLHX instructions are used to move data between the ACX/HI/LO registers and general-purpose registers. The first instruction, MFHI, loads the contents of the HI register into a general-purpose register. For example, "MFHI $5" loads the contents of the HI register into register $5. Similarly, MFLO loads the contents of the LO register into a general-purpose register. Conversely, the instructions MTHI and MTLO are used to load the contents of a general-purpose register into the HI or LO register. For example, "MTHI $5" loads the contents of register $5 into the HI register.

More generally, an instruction format for MFLHXU ("Move From Extended Carry, Hi and Lo (Unsigned)") is shown in FIG. 10A. When executed, the value in LO register 2023 is written into the general-purpose register "rd" specified by the instruction, as shown in FIG. 10A. The value in HI register 2022 is then written to LO register 2023, the bits in ACX register 2021 are zero-extended and copied to HI register 2022, and the ACX register bits are cleared. The number of ACX register bits is implementation dependent, and may range, for example, from 0 to 64 bits. If no ACX register bits are implemented in a particular implementation, the value of the ACX register will be taken to be zero.

Similarly, the instruction format for MTLHX ("Move to Lo, Hi and Extended Carry") is shown in FIG. 10B. When executed, an appropriate number of bits (e.g., eight) of the value in HI register 2022 are written into the ACX register 2021. The value in LO register 2023 is then written to the HI register, and the value in general-purpose register "rs" (specified by the instruction, as shown in FIG. 10B) is written to the LO register. This is the reverse of the operation of the MFLHXU instruction. Again, the number of ACX register bits is implementation dependent, and may range, for example, from 0 to 64 bits. If HI register 2022 contains more significant bits than the number implemented in ACX register 2021, that information is discarded without raising an exception. If no ACX register bits are implemented, the move from the HI register to ACX register is taken as a "no-op".

In one implementation, the content of the ACX register is not directly accessible. For purposes of discussion, in this implementation the ACX register is 8 bits wide, and the HI and LO registers are each 32 bits wide. To indirectly access the ACX register, the values stored in the ACX/HI/LO registers may be shifted to the left or right. For example, "MFLHXU $5" shifts the contents of the ACX, HI, and LO registers to the right by one register position, loading the contents of the LO register into register $5. Thus, after performing the operation, the ACX register is zero, the HI register contains the previous contents of the ACX register, the LO register contains the previous contents of the HI register, and the $5 register contains the previous contents of the LO register. Because the contents of the 8-bit ACX register are loaded into a 32-bit register, the 8-bit value may be zero-extended to 32-bits before loading the HI register.

The MTLHX performs the inverse operation. For example, "MTLHX $5" loads the ACX register with the previous contents of the HI register, loads the HI register with the previous contents of the LO register, and loads the LO register with the contents of the $5 register.

The PPERM operation performs permutations as specified in a register, and stores the result in the ACX/HI/LO registers. For example, "PPERM $5, $6" causes the ACX/HI/LO registers to be shifted 6-bits to the left. Then, low-order six bits are selected from register $5 as specified by register $6. The 32-bit contents of register $6 are used to select which bits of register $5 will be used to fill the low-order bits of the ACX/HI/LO registers. Since there are 32 bits in register $5, 5 bits are needed to specify a specific one of the 32 bits. For example, "01101" is binary for the number 13. Thus, these five bits may specify bit 13. Similarly, "00000" is binary for 0 and "11111" is binary for 31. Thus, all 32 bits may be specified using a 5-bit specifier.

Register $6 may specify the bits of $5 used to fill the low-order bits of ACX/HI/LO as follows: bits 0-4 are used to specify the source of bit 0, bits 5-9 are used to specify bit 1, bits 10-14 are used to specify bit 2, bits 15-19 are used to specify bit 3, bits 20-24 are used to specify bit 4, and bits 25-29 are used to specify bit 5. The remaining bits, 30-31, may be unused. Thus, the instruction is performed using the specifiers as described to fill the lowest 6 bits of the LO register with the specified bits from the $5 register.

Finally, MULTP may be used to perform binary polynomial multiplication and MADDP may be used to perform binary polynomial multiplication with the result added to the ACX/HI/LO registers. These operations are analogous to MULT and MADD, but operate on binary polynomial operands.

The polynomial operands of MULTP and MADDP are encoded in 32-bit registers with each bit representing a polynomial coefficient. For example, the polynomial "$x^4+x+1$" would be encoded as "10011" because the coefficients of $x^3$ and $x^2$ are "0" and the remaining coefficients are "1". The MULTP instruction performs binary polynomial multiplication on two operands. For example, $$(x^4+x+1)(x+1)=x^5+x^4+x^2+2x+1.$$

Reducing the polynomial modulo two, yields $x^5+x^4+x^2+1$. If the polynomials are encoded in the binary representation above, the same multiplication may be expressed as (10011)(11)=110101.

The MADDP instruction performs multiplication just as MULTP, adding the result to the ACX/HI/LO registers. Polynomial addition may be performed using a bitwise XOR. For example, the binary polynomial addition $(x^4+x+1)+(x+1)$ yields $x^4+2x+2$. Reducing the coefficients modulo 2 yields $x^4$ which may be expressed as "10000".

Referring to FIGS. 2 and 3, MDU 2020 receives two 32-bit operands, RS and RT. Using these operands, MDU 2020 performs a requested operation and stores a result in registers ACX 2021, HI 2022, and LO 2023. Major data paths that may be used to perform these operations are shown in FIG. 3. The RShold register 3010 and the RThold register 3012 are used to hold the RS and RT operands. Multiplexers 3020, 3022, and 3024 are used to select whether to use the RS and RT operands directly or to use the values stored in the RShold register 3010 and the RThold register 3012. Additionally, multiplexer 3022 may be used to select between the low-order and high-order bits of RT or the value stored in the RThold register 3012.

The RThold register 3012 is connected to multiplexer 3022. Multiplexer 3022 produces a 16-bit result by selecting the high-order bits of RThold 3012, the low-order bits of RThold 3012, the high-order bits of the RT operand, or the low-order bits of the RT operand. The output from multiplexer 3022 is processed by Booth recoder 3040 and stored in register RTB 3042. Booth recoding is a technique that permits the multiplier array to treat signed and unsigned operands the same. The output of register RTB 3042 becomes the input SEL 3034 to array unit 3030.

Array unit 3030 is used to perform arithmetic and binary polynomial multiplication as described below with reference to FIG. 4. Array unit 3030 takes as inputs ACC1 3031, ACC2 3032, M 3033, SEL 3034, and RThold 3012. Inputs ACC1 3031 and ACC2 3032 are accumulated results used for operations that perform a multiplication and add or subtract the resulting value from an accumulated result. The inputs SEL 3034 (determined by register RTB 3042) and M 3033 (determined by register RShold 3010) form the operands for arithmetic operations. The inputs RThold 3012 (or the high-order or low-order bits of RThold 3012) and M 3033 (determined by RShold 3010) form operands for polynomial operations and permutations. Combinations of these inputs are used to perform various calculations as described in detail below.

Array unit 3030 also includes two outputs, ResultC 3035 and ResultS 3036. In performing arithmetic operations, carry-save adders (CSAs) may be used to build a multiplication array. Carry-save adders calculate sums and carries separately to produce two outputs. Thus, ResultC 3035 and ResultS 3036 represent, respectively, the carry and the sum outputs of a CSA multiplier array. In one implementation, ACC1 3031, ACC2 3032, ResultC 3035, and ResultS 3036 are each 72 bits long and the remaining inputs are at most 32 bits long. Inputs ACC1 3031 and ACC2 3032 may be selected using multiplexers 3037 and 3038.

Multiplexers 3050 and 3052 are used to select values as inputs to registers CPAA 3054 and CPAB 3056. For example, multiplexer 3050 may be used to select between ResultC 3035, the output of CPA 3058, or the output of multiplexer 3020 (i.e., operand RS or RShold 3010). Similarly, multiplexer 3052 may be used to select between ResultS 3036, the value 0, and the output of multiplexer 3024. These registers store the inputs to carry-propagate adder (CPA) 3058. CPA 3058 may be used to complete multiplication operations (multiplies) and to perform iterative division operations (divides) as discussed below.

Register RDM 3060 stores the result of CPA 3058. Finally, multiplexers 3070 and 3072 select which values form the result are to be loaded into registers ACX, HI, and LO. Multiplexer 3070 may be used to select the ACX/HI/LO registers, RDM 3060, or the result of CPA 3058. Multiplexer 3072 may be used to instead load various permutations of the result selected by multiplexer 3070. Multiplexer 3072 is used to perform various rotations and loads of the ACX/HI/LO registers by permitting selection of the following values (forming 32-bit values when concatenated): (1) ahl, the 72-bit output of multiplexer 3070; (2) arl, the 8 high-order bits of multiplexer 3070, the contents of RShold 3010, and the 32 low-order bits of multiplexer 3070; (3) ahr, the 40 high-order bits of multiplexer 3070 and the contents of RShold 3010; (4) hlr, the 40 low-order bits of multiplexer 3070 and the contents of RShold 3010; and (5) 0ah, the 40 high-order bits of multiplexer 3070 (with 32 leading zeros).

The HI/LO registers are used to store the results of multiplication and to provide support for accumulator operations. In one implementation, the precision of the HI/LO registers is increased by adding register ACX as an extended accumulator. Thus, the ACX/HI/LO registers may store a 72-bit value. The corresponding data paths shown in FIG. 3 and the accumulator capabilities of arrays 3030 also may be increased to support 72-bit values. Some operations cause the values stored in the result registers ACX, HI, and LO to be overwritten. For this reason, a separate result register 3080 may be provided to store the high-order and low-order result without the accumulator ACX.

Because the extended precision accumulator ACX/HI/LO may have higher precision than the general-purpose registers, it is not possible to load all 72 bits into a general-purpose register. Thus, it is desirable to provide instructions to support loading and manipulating the contents of the ACX/HI/LO registers (e.g., MFLHXU and MTLHX).

The data path described below includes six major parts: (1) input registering and selection; (2) Booth recoding; (3) multiplier arrays and permutation logic; (4) a carry propagate adder; (5) result registering and selection; and (6) a separate 32-bit output register for presenting results.

Input registering and selection is performed using the RShold and RThold registers to hold the RS and RT operands. Multiplexers select whether to use these operands directly or to use the registered versions. Booth recoding is performed on half of the RT operand at a time to provide inputs to the multiplier arrays and permutation logic.

Booth recoding is a technique that permits the multiplier array to treat signed and unsigned operands the same. This technique "recodes" operands as a subtraction from the next highest power of two. For example, 7 may be Booth recoded as follows: $8-1=1000_2-0001_2=100\bar{1}$, wherein $\bar{1}$ represents $-1$. Hennessy and Patterson describe Booth recoding in Appendix A of "Computer Architecture: A Quantitative Approach," Morgan Kaufmann Publishers, Inc. (1996), which is hereby incorporated by reference in its entirety for all purposes.

One array of array unit 3030 performs arithmetic multiplication and one array of array unit 3030 performs binary polynomial multiplication. In one implementation, both arrays are 32 bits by 16 bits (32×16) and are used once or twice depending on the size of the RT operand (i.e., an appropriate array is used once when RT is 16 bits long and twice when 32 bits long). The CPA may be used to complete multiplies and perform iterative divides. Other implementations may include faster mechanisms for performing divides.

The arithmetic multiplication array may be implemented using any of the techniques described by Hennessy and Patterson in the incorporated "Computer Architecture: A Quantitative Approach," Morgan Kaufmann Publishers, Inc. (1996). For example, Appendix A of Hennessy and Patterson describes several ways to speed up arithmetic multipliers. Any of the described techniques may be used as a basis for the polynomial multiplication extensions described below.

Figure 4:
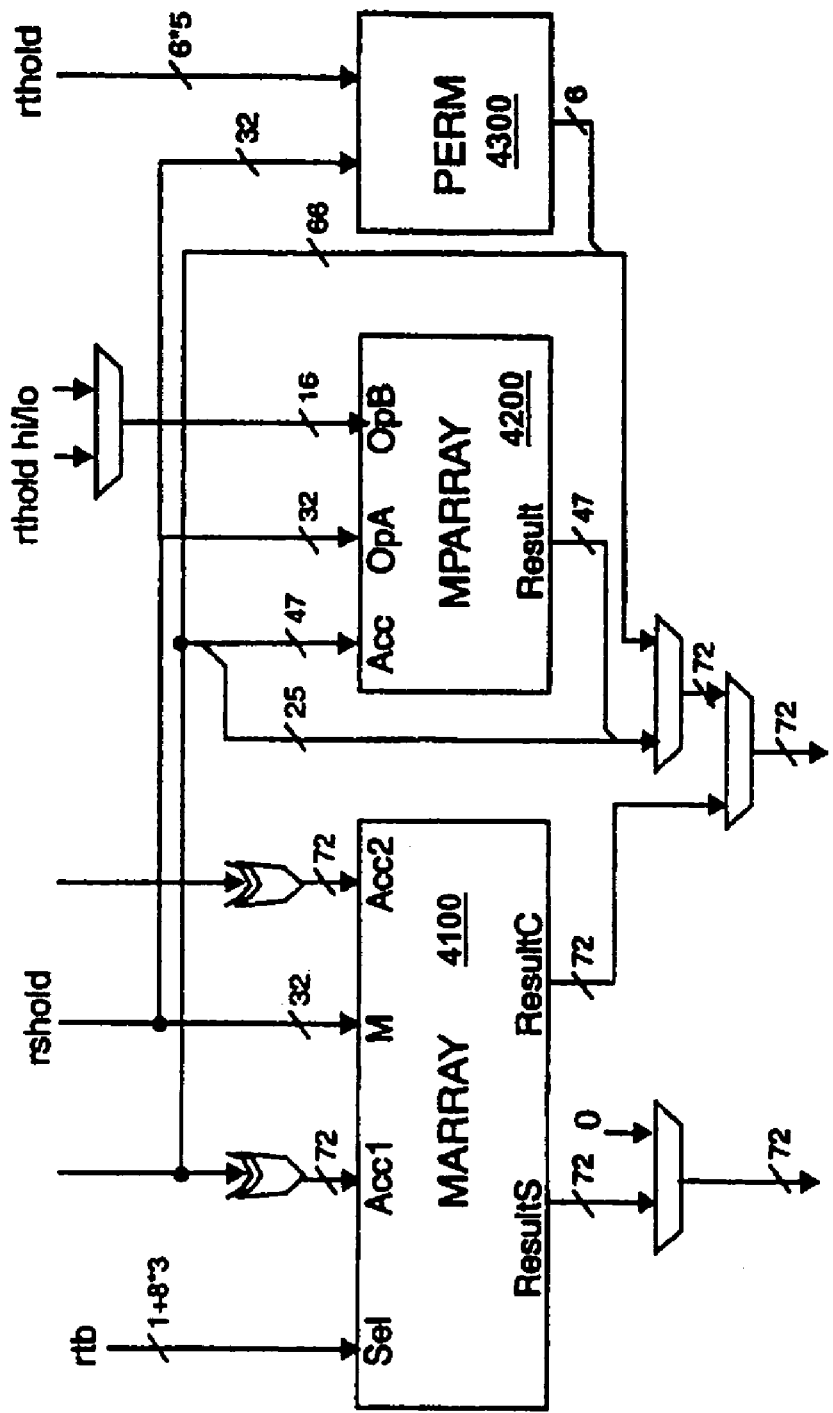
FIG. 4 is a block diagram of multiplier arrays supporting arithmetic and binary polynomial multiplication in one implementation.

Referring to FIG. 4, array unit 3030 includes two parallel multipliers (Marray 4100 and MParray 4200) and permutation logic 4300. The first array, Marray 4100, performs arithmetic multiplication as described below with reference to FIG. 5. Marray 4100 uses the following inputs as described above: ACC1 3031, ACC2 3032, M 3033, and SEL 3034. The outputs include ResultC 3035 and ResultS 3036. The second array, MParray 4200, performs binary polynomial multiplication as described below with reference to FIG. 6. MParray 4200 uses the following inputs as described above: the low-order bits of RThold 3012 or the high-order bits of RThold 3012; RShold 3010; and ACC1 3031. The output of MParray 4200 is ResultC 3036. Finally, permutation logic 4300 is used to perform various permutations on the low-order bits of RShold 3010 based on the value stored in RThold 3012.

Figure 5:
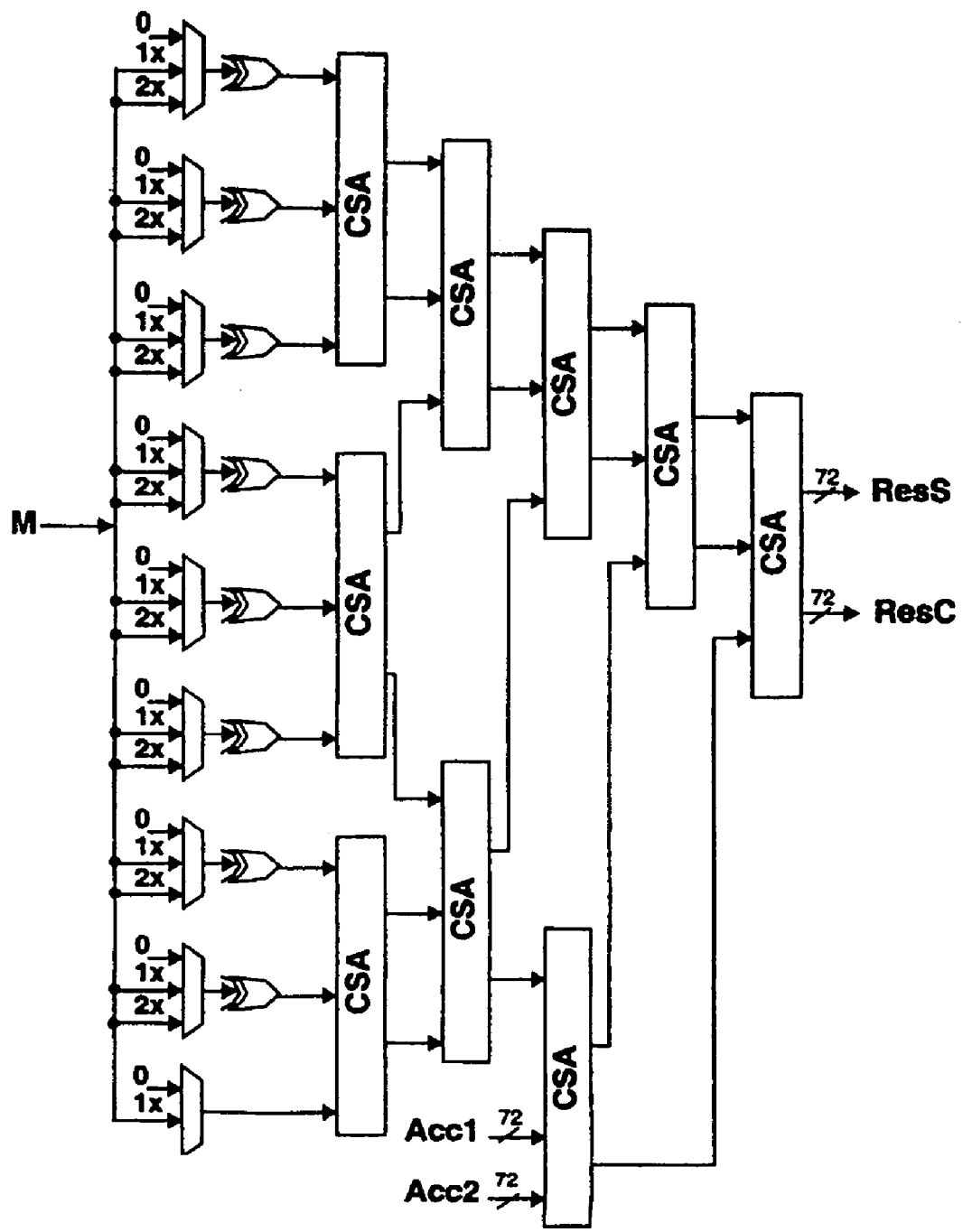
FIG. 5 is a block diagram of an arithmetic multiplier array that may be used in the implementation shown in FIG. 4.

Referring to FIG. 5, Marray 4100 is a 32-bit by 16-bit Wallace tree multiplier array that has been modified to support the addition of two 72-bit wide operands ACC1 and ACC2. The ACC1 and ACC2 operands hold a carry-save representation of a 72-bit value. Because additions are already performed to carryout multiplications (i.e., by the carry-select adders (CSAs)), an additional adder may be included to all ACC1 and ACC2 to be added to intermediate results of multiplications. Marray 4100 generates a 72-bit wide result in a carry-save representation. Since 32×16 bits are processed per cycle, two passes through the array are required for 32×32 bit multiplies.

Marray 4100 is implemented as a Wallace tree built from arrays of carry-save adders. The width of these arrays may vary. This design may be implemented using an automated place and route rather than using data path style. Because the accumulate value from the previous array pass is input late into the array, the accumulate value does not need to come directly from a register. Booth recoding is performed using the method of overlapping triplets to more efficiently process multiplications. The output of Booth recoding tells whether to add operand M multiplied by −2, −1, 0, 1, or 2 for each power of 4. The multiplexers on the top-level CSA inputs are used to select the corresponding multiple of M.

Marray 4100 accumulates eight products from the Booth recoding plus one special partial product. The latter may be used for 32-bit unsigned calculations using the "0" and "1x" choices from the multiplexers. Within the Wallace tree, operands may be sign-extended to properly accumulate 2's complement results.

Figure 6:
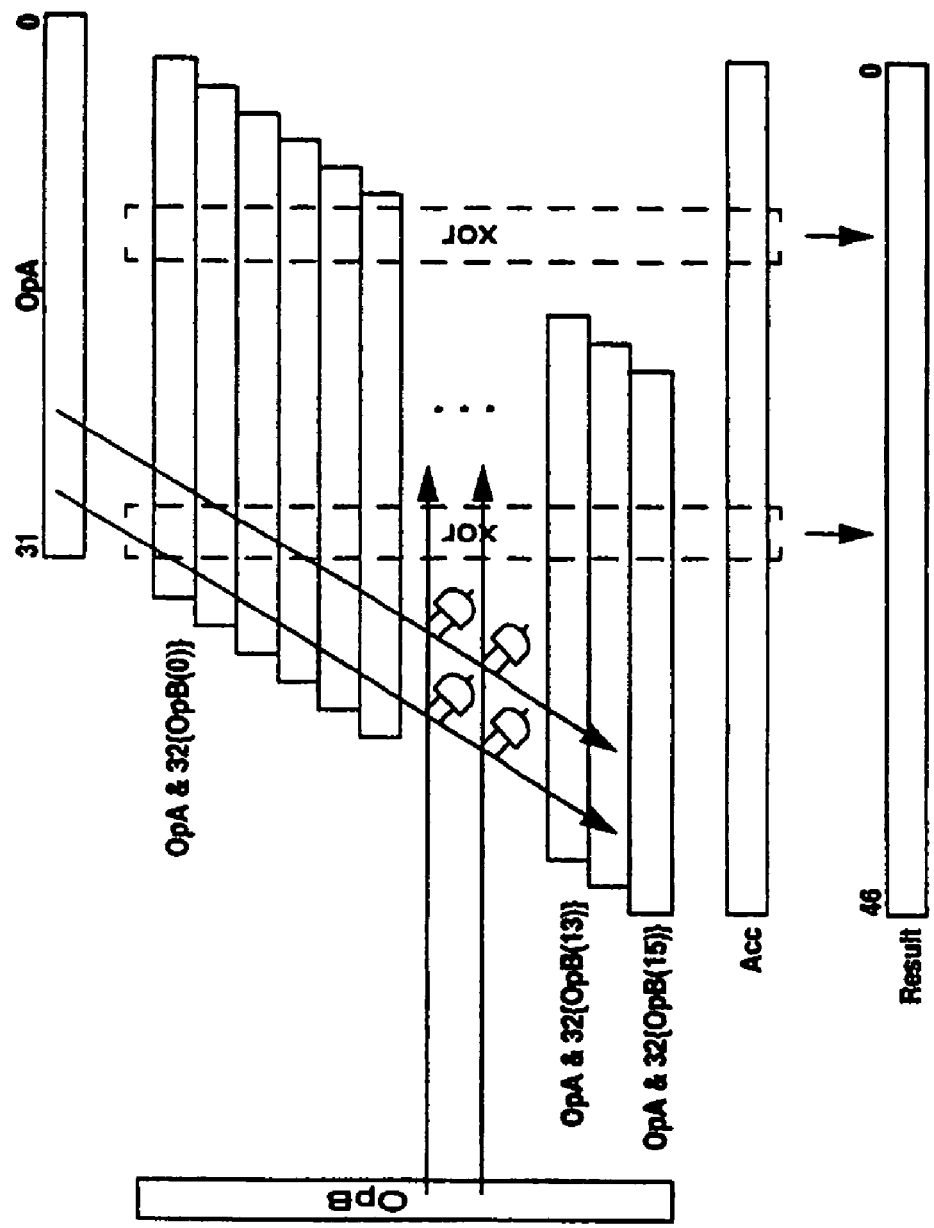
FIG. 6 is a block diagram of a binary polynomial multiplier array that may be used in the implementation shown in FIG. 4.

Referring to FIG. 6, binary polynomial-based multiplication operations are processed similarly to corresponding unsigned arithmetic operations. In one implementation, MParray 4200 is a 32×16 bit array that also performs an addition using exclusive-or (XOR) on an operand, for example, ACC1. As with Marray 4100, 32×16 bits are processed per cycle and two passes through the array may be used for 32×32 multiplies. In the first cycle, ACC1 is zero (for a MULTP operation) or the previous result (for a MADDP operation). In a second cycle, ACC1 is the high order bits of the output from the first cycle.

MParray 4200 multiplies two operands (e.g., OpA and OpB) using an array with each row formed by taking the AND of OpA and a bit of OpB. For example, the first row is the logical AND of OpA and bit 0 of OpB. Row two is the logical AND of OpA and bit 1 of OpB. The result of each successive row is shifted one bit to the left. The final result is formed by taking the exclusive-or (XOR) of each column. Because a bitwise XOR may be used to perform addition in binary polynomial arithmetic, an accumulator row may be added to array MParray 4200 to support instructions such as MADDP.

Three multiplexers shown in FIG. 4 are used to select either zero or the sum output of Marray 4100 to form ResultS 3036; and the output of Marray 4100, MParray 4200, or permutation logic 4300 to form ResultC 3035.

Referring again to FIG. 1, MDU 2020 starts a computation in the first cycle of the execute stage 1003 of the pipeline. If the calculations complete before the instruction has moved past the memory stage 1004 in the pipeline, then the result is held at that point. If the operation completes when the instruction has been moved past the memory stage 1004 in the pipeline, then the instruction has been committed and the results are written directly to the ACX/HI/LO registers.

The MDU 2020 is decoupled from the environment pipeline; it does not stall with the environment. That is to say the MDU 2020 will continue its computation during pipeline stalls. In this way, multi-cycle MDU operations may be partially masked by system stalls and/or other, non-MDU instructions.

Figure 7A:
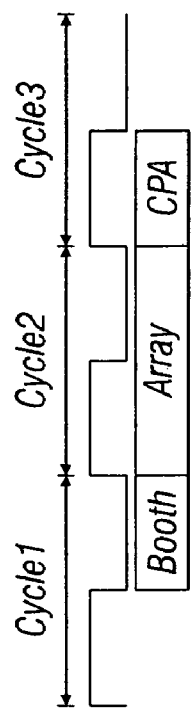
FIG. 7A is a timing diagram showing the operation of 32-bit by 16-bit multiplies in one implementation.

FIG. 7A shows the pipeline flow through MDU 2020 for 32×16 bit multiplies. RS and RT arrive late, so the first cycle may be used for Booth recoding. The second cycle is where the array is run and the third cycle is where the CPA 3058 completes the computation. Because the results are always accessible to reads by MFxx instructions, 32×16 multiplies may be run without stalls. A 32×16 MUL, which returns the result directly to a general-purpose register (GPR) may stall for one cycle.

Figure 7B:
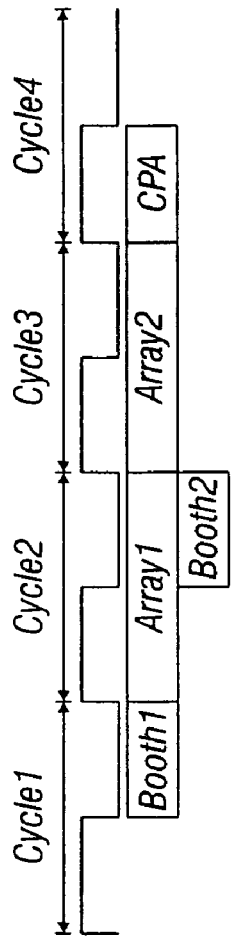
FIG. 7B is a timing diagram showing the operation of 32-bit by 32-bit multiplies in one implementation.

Referring to FIG. 7B, for 32×32 bit multiplies, the array is used twice, which adds one extra clock cycle to the 32×16 bit multiplications. As the first array pass is completing for the first portion of operand RT, Booth recoding is performed on the second portion of the operand. Thus, the Booth recoded portion of RT is available to begin the second pass through the array immediately after the first pass is complete. The multiplication result is then calculated using CPA 3058.

Figure 7C:
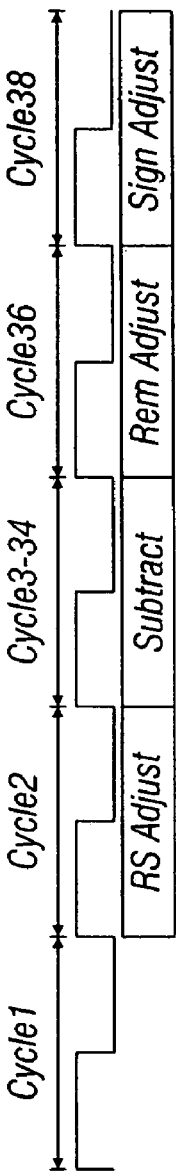
FIG. 7C is a timing diagram showing the operation of divisions in one implementation.

Referring to FIG. 7C, a simple non-restoring division algorithm may be used for positive operands. The first cycle is used to negate RS, if needed. For timing reasons, this cycle is taken even if RS is positive. Following that, 32, 25, 18, or 10 cycles of iterative add/subtract operations are performed. The actual number is based on the amount of leading zeros on the positive RS operand. A final remainder adjust may be needed if the remainder was negative. For timing reasons, this cycle is taken even if the remainder adjust is not needed. Finally, sign adjustment is performed if needed on the quotient and/or remainder. If both operands are positive, this cycle may be skipped.

In one implementation, target applications demand fast division. Many techniques may be used to increase the performance of division. For example, the Sweeney, Robertson, and Tocher (SRT) algorithm or some variation thereof may be used.

Figure 8:
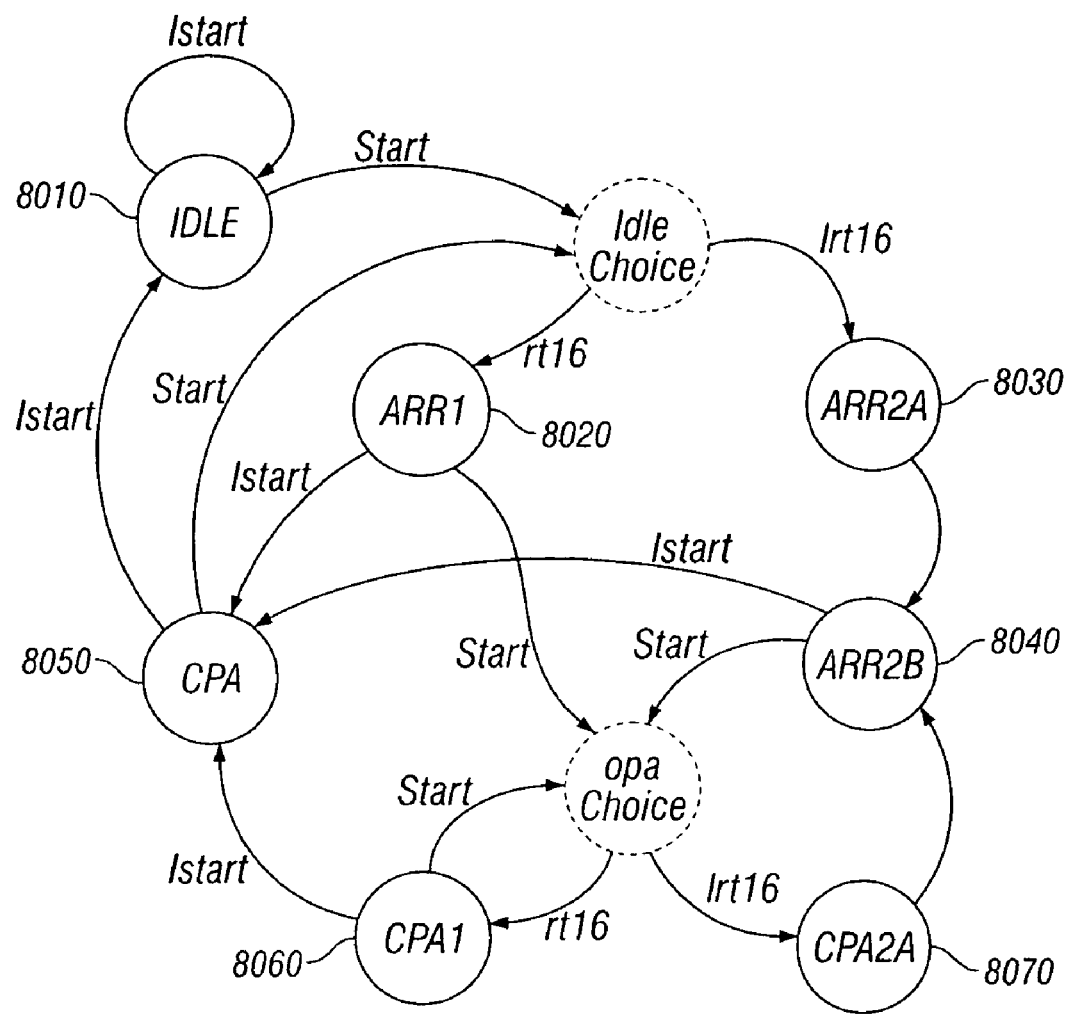
FIG. 8 is finite state machine implementing steps for performing multiply instructions.

Referring to FIG. 8, multiplication operations are implemented using a finite state machine. Multiplication begins in IDLE state 8010. The multiplier stays in the idle state until the start signal is asserted. The multiplier then transitions to either the ARR1 state 8020 or the ARR2A state 8030 depending on whether operand RT contains a 32-bit or 16-bit value. If a 16-bit value is stored in RT, then the system transitions to state ARR2A 8030 where the first array pass is run. Then, the multiplier transitions to state ARR2B 8040 where the second array pass is run. If a 16-bit value is stored in operand RT, the multiplication is run through the array unit in state ARR1 8020.

In this implementation, the multiplier is pipelined. One multiplication may be run through the array unit and another through the CPA. Thus, the multiplier either transitions from ARR1 8020 or ARR2B 8040 to state CPA 8050 if there is no additional multiplication to perform, or begins a second multiplication. If no additional multiplication is needed, the multiplier is run through CPA 8050 and then either returns to IDLE 8010 or begins a new multiplication as discussed above.

If a second multiplication is ready to be performed when the first multiplication is ready to be run through the CPA, then the multiplier either transitions to CPA1 8060 (for a 32×16 multiplication) or CPA2A 8070 (for a 32×32 multiplication). In state CPA1 8060, the first multiplication is run through the CPA and the second multiplication is run through the array unit. The multiplier then transitions to state CPA 8050 to finalize the second multiplication.

If the second multiplication is a 32-bit multiplication, then in state CPA2A 8070 the first multiplication is run through the CPA and the second multiplication is run through the array unit. The multiplier then transitions to state ARR2B 8040 to complete the 32×32 multiplication. This pipelined approach allows 32×16 multiplications to be issued every clock cycle, with a two-cycle latency. Also, 32×32 multiplications may be issued every other clock cycle, with a three-cycle latency.

Figure 9:
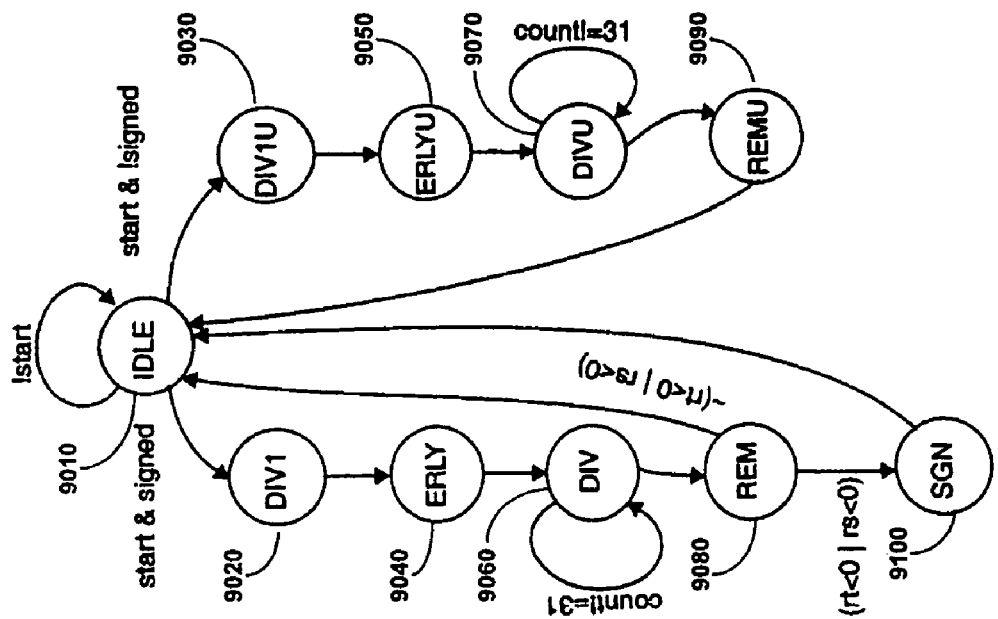
FIG. 9 is a finite state machine implementing steps for performing division instructions.

Referring to FIG. 9, iterative division operations may be implemented using a finite state machine. In one implementation, the MDU begins in IDLE state 9010. When a signal is received to begin a division operation, the MDU either transitions to DIV1 9020 if the operation is signed or DIV1U 9030 if the operation is unsigned. States DIV1 9020 and ERLY 9040 are used to prepare signed operands for division, adjusting the signs as necessary. States DIV1U 9030 and ERLYU 9050 are used to prepare an unsigned division operation. In states ERLY 9040 and ERLYU 9050, leading zeros are detected in operand RS to adjust the number of division iterations necessary.

Iterative division is performed in states DIV 9060 and DIVU 9070. Division may be performed by using a series of iterative add/subtracts and shifts. Finally, the remainders are finalized in states REM 9080 and REMU 9090. If either of the operands is negative, sign adjustment is performed in state SGN 9100.

Referring again to FIG. 4, in one implementation, permutation logic 4300 is used to support the PPERM instruction described above. Permutation logic 4300 consists of 6 single bit 32:1 selectors that may be used to select any of the 32 bits of RShold 3010 based on the value of RThold 3012. This logic may be implemented directly in the data path module.

For example, permutation logic 4300 may be used to execute the instruction "PPERM $5, $6". Permutation logic 4300 uses 6 5-bit selectors determined by RThold 3012 to identify which bits to include as output from RShold 3010. For example, if register $5 contains the low-order bits "010101", then the selector "00010" would choose bit 2 (i.e., the third bit from the right) containing "1". If RThold 3012 contains the low-order bits "0001000011", then bit 2 (containing a "1") and bit 3 (containing a "0") will be selected yielding "10". Using this method, permutation logic 4300 may select bits from RShold 3010 to generate 6 bits based on RThold 3012. The resulting 6 bits concatenated to the 66 low-order bits of ACC1 to form the result. This effectively shifts the 66 low-order bits of ACC1 six bits to the left and replaces the 6 low-order bits with the output of the permutation logic 4300.

In addition to multiplier implementations using hardware (e.g., within a microprocessor or microcontroller), implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claims.

What is claimed is:

1. A microprocessor, comprising:
   an instruction execution unit; and
   a multiply unit, coupled to the execution unit, that includes a low-order register, a high-order register, and an extended register,
   wherein execution of a first instruction by the execution unit causes data stored in the extended register to be zero-extended and moved from the extended register to the high-order register, and
   wherein execution of a second instruction by the execution unit causes a subset of data stored in the high-order register to be moved from the high-order register to the extended register.

2. The microprocessor of claim 1, wherein the multiply unit includes an arithmetic multiplier.

3. The microprocessor of claim 2, wherein the arithmetic multiplier is a twos-complement binary arithmetic multiplier.

4. The microprocessor of claim 1, wherein the multiply unit includes a polynomial multiplier.

5. The microprocessor of claim 4, wherein the polynomial multiplier is a polynomial basis arithmetic multiplier.

6. The microprocessor of claim 4, wherein execution of the first instruction by the execution unit causes data stored in the low-order register to be moved from the low-order register to a general-purpose register of the microprocessor.

7. The microprocessor of claim 1, wherein execution of the second instruction by the execution unit causes data stored in a general-purpose register of the microprocessor to be moved from the general purpose register to the low-order register.

8. A multiply unit for a microprocessor, comprising:
   an arithmetic multiplier;
   a polynomial multiplier; and
   an extended-precision accumulation register coupled to the arithmetic multiplier and the polynomial multiplier, wherein the extended-precision accumulation register includes a low-order register, a high-order register, and an extended register,
   wherein execution of a first instruction by an execution unit of the microprocessor causes data stored in the extended register to be zero-extended and moved from the extended register to the high-order register, and
   wherein execution of a second instruction by the execution unit of the microprocessor causes a subset of data stored in the high-order register to be moved from the high-order register to the extended register.

9. The multiply unit of claim 8, wherein the arithmetic multiplier is a twos-complement binary arithmetic multiplier.

10. The multiply unit of claim 8, wherein the polynomial multiplier is a polynomial basis arithmetic multiplier.

11. The multiply unit of claim 8, wherein execution of the first instruction by the execution unit causes data stored in the low-order register to be moved from the low-order register to a general-purpose register of the microprocessor.

12. The multiply unit of claim 8, wherein execution of the second instruction by the execution unit causes data stored in a general-purpose register of the microprocessor to be moved from the general purpose register to the low-order register.

13. A tangible computer-readable storage medium comprising a microprocessor core embodied in software, the microprocessor core comprising:
   an instruction execution unit; and
   a multiply unit, coupled to the execution unit, that includes a low-order register, a high-order register, and an extended register,
   wherein execution of a first instruction by the execution unit causes data stored in the extended register to be zero-extended and moved from the extended register to the high-order register, and
   wherein execution of a second instruction by the execution unit causes a subset of data stored in the high-order register to be moved from the high-order register to the extended register.

14. The tangible computer-readable storage medium of claim 13, wherein the multiply unit includes an arithmetic multiplier.

15. The tangible computer-readable storage medium of claim 13, wherein the multiply unit includes a polynomial multiplier.

16. The tangible computer-readable storage medium of claim 13, wherein execution of the first instruction by the execution unit causes data stored in the low-order register to a general-purpose register of the microprocessor.

17. The tangible computer-readable storage medium of claim 13, wherein execution of the second instruction by the execution unit causes data stored in a general-purpose register of the microprocessor to be moved from the general purpose register to the low-order register.

18. The tangible computer-readable storage medium of claim 13, wherein the microprocessor core is embodied in hardware description language program code.

* * * * *